US008204505B2

(12) United States Patent
Jin et al.

(10) Patent No.: US 8,204,505 B2
(45) Date of Patent: Jun. 19, 2012

(54) MANAGING NETWORK-INITIATED QUALITY OF SERVICE SETUP IN MOBILE DEVICE AND NETWORK

(75) Inventors: Haipeng Jin, San Diego, CA (US); Osok Song, San Diego, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 12/483,638

(22) Filed: Jun. 12, 2009

(65) Prior Publication Data

US 2010/0009690 A1    Jan. 14, 2010

Related U.S. Application Data

(60) Provisional application No. 61/073,218, filed on Jun. 17, 2008.

(51) Int. Cl.
*H04W 72/00* (2009.01)

(52) U.S. Cl. ..................................... 455/450; 455/452.2

(58) Field of Classification Search ......................... None
See application file for complete search history.

(56) References Cited

U.S. PATENT DOCUMENTS

| 7,227,865 B2 | 6/2007 | Shaheen et al. | |
|---|---|---|---|
| 2006/0250956 A1* | 11/2006 | Alfano et al. | 370/230 |
| 2010/0217877 A1* | 8/2010 | Willars et al. | 709/228 |

FOREIGN PATENT DOCUMENTS

| WO | WO 2007/128343 | * 11/2007 |
| WO | WO 2007/128343 A1 | * 11/2007 |
| WO | WO2007128343 | 11/2007 |

OTHER PUBLICATIONS

"3rd Generation Partnership Project;Technical Specification Group Core Network and Terminals;Non-Access-Stratum (NAS) protocol for Evolved Packet System (EPS); Stage 3(Release.8)" 3GPP Draft; 24301-030, 3RD Generation Partnership Project (3GPP), Mobile Competence Centre ; 650, Route Des Lucioles ; F-06921 Sophia-Antipolis Cedex ; France, vol. CT WGl, No. Zagreb, Croatia; 20080615, Jun. 15, 2008, pp. 1-113, XP050029403 [retrieved on Jun. 15, 2008] Par. 6.4.1-6.4.2 Par. 6.5.1 Par. 6.5.3.

(Continued)

*Primary Examiner* — Charles Appiah
*Assistant Examiner* — Christopher Kohlman
(74) *Attorney, Agent, or Firm* — D. Scott Juneau

(57) ABSTRACT

Systems, methodologies, and devices are described that manage employment of network (NW)-initiated resource allocation and user equipment (UE)-initiated resource allocation for a UE. To employ NW-initiated resource allocation, a core network can transmit an indicator to the UE indicating that Policy and Charging Control (PCC) is supported by a network associated with the UE. The UE receives the indicator and other information, such as indicator regarding whether the current access network supports NW-initiated resource allocation and whether the current application prefers NW-initiated resource allocation, determines that NW-initiated resource allocation is to be employed, and the core network initiates resource allocation for the UE. If any indicator is not received by the UE, or the UE receives an indicator that indicates PCC is not supported or not preferred, the UE determines that UE-initiated resource allocation is to be employed, and transmits a request for resource allocation to the core network.

29 Claims, 13 Drawing Sheets

OTHER PUBLICATIONS

"Digital cellular telecommunications system (Phase 2+); Universal Mobile Telecommunications System (UMTS); End-to-end Quality of Service (QoS) concept and architecture (3GPP TS 23.207 version 7.0.0 Release 7); ETSI TS 123 207" ETSI Standards, LIS, Sophia Antipolis Cedex, France, vol. 3-SA2, No. V7.0.0, Jun. 1, 2007, pp. 1-41, XP014037752 ISSN: 0000-0001 Par. 1 Par. 5.2.2 Par. 5.2.3a Par. 5.2.4 Par. 6.1.

"Digital cellular telecommunications system (Phase 2+); Universal Mobile Telecommunications System (UMTS); Policy and charging control architecture (3GPP TS 23.203 version 7.7.0 Release 7); ETSI TS 123 203" ETSI Standard, European Telecommunications Standards Institute (ETSI), Sophia Antipolis Cedex, France, vol. 3-SA2, No. V7.7.0, Jun. 1, 2008, pp. 1-74, XP014042062 Par. 1 Par. 4.3.3.2 Par. 6.1.5 Par. 6.2.3 Par. 6.3.2.

International Search Report & Written Opinion—PCT/US2009/047693, International Search Authority—European Patent Office—Mar. 23, 2010.

* cited by examiner

MANAGING NETWORK-INITIATED QUALITY OF SERVICE SETUP IN MOBILE DEVICE AND NETWORK

CLAIM OF PRIORITY UNDER 35 U.S.C. §119

The present application for patent claims priority to Provisional Application No. 61/073,218 entitled "METHOD FOR HANDLING NETWORK-INITIATED QUALITY OF SERVICE SETUP IN MOBILE AND NETWORK" filed on Jun. 17, 2008, and assigned to the assignee hereof and hereby expressly incorporated by reference herein.

BACKGROUND

1. Field

The following description relates generally to wireless communications, and more particularly to managing network-initiated Quality of Service (QoS) setup in a mobile device and network.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Conventionally, the LTE/SAE allows a mixed mode of operation for QoS setup where either the UE or the network can initiate the process for setting up resources for an application. However, the current standard does not provide guidance regarding avoiding race conditions or long delays in waiting for resources that can result from usage of mixed mode operation. For instance, if a UE and the network each attempt to set up resources for an application, there can be multiple race conditions where the processes initiated by the UE can cross or conflict with the processes initiated by the network. In another instance, if the UE is expecting the network to set up resources, but the network does not have the policy and charging control functionality required to initiate resource setup, the UE will not receive desired QoS for certain applications. It is desirable to be able to utilize mixed mode of operation for QoS setup while avoiding race conditions or long delays in waiting for resources that can result from usage of mixed mode operation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating efficient connection and communication associated with a communication device (e.g., mobile communication device, also referred to an user equipment (UE)) within a network by managing employment of network (NW)-initiated resource allocation (e.g., Quality of Service (QoS) and UE-initiated resource allocation for the communication device. When a UE connects to an access network associated with a core network, a Type 1 application, which supports UE-initiated resource allocation only and which can be either an operator controlled application or is not an operator controlled application, or a Type 2 application, which prefers NW-initiated resource allocation but also supports UE-initiated resource allocation and which can normally be an operator controlled application, can be employed with the communication device. In an aspect, to facilitate employing dynamic NW-initiated resource allocation, Policy and Charging Control (PCC) needs to be supported where a Policy and Charging Rules Function (PCRF) in the core network authorizes PCC/QoS rules and provisions the rules to the appropriate gateways within the network to trigger NW-initiated resource allocation. In another aspect, to employ NW-initiated resource allocation and resolve ambiguities on whether the UE should wait for the network to set up resources, the core network can transmit an indicator (e.g., PCC support indicator) to the communication device indicating that PCC for NW-initiated resource allocation is supported by the current network associated with the communication device. The communication device can receive the indicator(s) and can determine that NW-initiated resource allocation is to be employed, and the core network can initiate resource allocation to facilitate establishing a bearer between the communication device and the core network. If the indicator (e.g., PCC support indicator) is not received by the communication device, or if the communication device receives an indicator that indicates PCC for NW-initiated resource allocation is not supported by the network, the communication device can determine that UE-initiated resource allocation is to be employed, and the communication device can generate and transmit a request for resource allocation to the core network to facilitate allocating resources for the communication device and establishing bearer between the communication device and core network. In yet another aspect, when a Type 2 application is being employed, but the communication device is roaming, the roaming network may not support the PCC framework and thus can indicate to the communication device that PCC is not supported. Even if the home PCRF is configured to prefer NW-initiated resource allocation for the application, the communication device may have to use UE-initiated resource allocation.

According to related aspects, a method that facilitates communication associated with a mobile communication device is described herein. The method can include receiving at least one indicator that indicates at least whether Policy and Charging Control (PCC) for network-initiated resource allocation is supported by a core network to facilitate determining whether resource allocation for the mobile communication device is to be initiated by the mobile communication device or the core network. Further, the method can comprise establishing a bearer between the mobile communication device and the core network in accordance with the resource allocation initiated by the mobile communication device or the core network based at least in part on the at least one indicator.

Another aspect relates to a wireless communications apparatus. The wireless communications apparatus can include a memory that retains instructions related to reception of at least one indicator that indicates whether PCC for network-initiated resource allocation is supported by a core network and resource allocation for a mobile communication device is to be initiated by the mobile communication device or the core network, and set up of a bearer between the mobile communication device and the core network in accordance with the resource allocation initiated by the mobile communication device or the core network based at least in part on the at least one indicator. Further, the wireless communications apparatus can include a processor, coupled to the memory, configured to execute the instructions retained in the memory.

Yet another aspect relates to a wireless communications apparatus that facilitates communication associated with a mobile device. The wireless communications apparatus can include means for receiving at least one indicator that indicates whether PCC for network-initiated resource allocation is supported by a core network and resource allocation for the mobile device is to be initiated by the mobile device or the core network. Further, the wireless communications apparatus can comprise means for establishing a bearer between the mobile device and the core network in accordance with the resource allocation initiated by the mobile device or the core network based at least in part on the at least one indicator.

Still another aspect relates to a computer program product, comprising: a computer-readable medium comprising code for: a first set of codes for causing a computer to receive at least one indicator that indicates whether PCC for network-initiated resource allocation is supported by a core network and resource allocation for the mobile communication device is to be initiated by the mobile communication device or the core network; and a second set of codes for causing the computer to set up a bearer between the mobile communication device and the core network in accordance with the resource allocation initiated by the mobile communication device or the core network based at least in part on the at least one indicator.

In accordance with another aspect, an apparatus in a wireless communication system can include a processor, wherein the processor can be configured to receive at least one indicator that indicates whether PCC for network-initiated resource allocation is supported by a core network and resource allocation for a mobile device is to be initiated by the mobile device or the core network. Moreover, the processor can be configured to establish a bearer between the mobile device and the core network in accordance with the resource allocation initiated by the mobile device or the core network based at least in part on the at least one indicator.

According to other aspects, a method that facilitates communication associated with a mobile device is described herein. The method can include transmitting at least one indicator to the mobile device to facilitate indicating to the mobile device that PCC for network-initiated resource allocation is supported and at least one of a core network is to initiate resource allocation associated with the mobile device or the mobile device is to initiate the resource allocation associated with the mobile device. Further, the method can comprise establishing a bearer between the mobile device and the core network in accordance with the resource allocation initiated by the mobile device or the core network based at least in part on the at least one indicator.

Yet another aspect relates to a wireless communications apparatus that can include a memory that retains instructions related to transmission of at least one indicator to a mobile device to facilitate indicating to the mobile device that PCC for network-initiated resource allocation is supported and at least one of a core network is to initiate resource allocation associated with the mobile device or the mobile device is to initiate the resource allocation associated with the mobile device, and establishment of a bearer between the mobile device and the core network in accordance with the resource allocation initiated by the mobile device or the core network based at least in part on the at least one indicator. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for transmitting at least one indicator to the mobile communication device to facilitate indicating to the mobile communication device that PCC for network-initiated resource allocation is supported and at least one of a core network is to initiate resource allocation associated with the mobile communication device or the mobile communication device is to initiate the resource allocation associated with the mobile communication device. Further, the wireless communications apparatus can include means for setting up a bearer between the mobile communication device and the core network in accordance with the resource allocation initiated by the mobile communication device or the core network based at least in part on the at least one indicator.

Still another aspect relates to a computer program product, comprising: a computer-readable medium comprising code for: a first set of codes for causing a computer to transmit at least one indicator to a mobile communication device to facilitate indicating to the mobile communication device that PCC for network-initiated resource allocation is supported and at least one of a core network is to initiate resource allocation associated with the mobile communication device or the mobile communication device is to initiate the resource allocation associated with the mobile communication device; and a second set of codes for causing a computer to establish a bearer between the mobile communication device and the core network in accordance with the resource allocation initiated by the mobile communication device or the core network based at least in part on the at least one indicator.

In accordance with another aspect, an apparatus in a wireless communication system can include a processor, wherein the processor can be configured to transmit at least one indicator to the mobile communication device to facilitate indicating to the mobile communication device that PCC for network-initiated resource allocation is supported and at least one of a core network is to initiate resource allocation associated with the mobile communication device or the mobile communication device is to initiate the resource allocation associated with the mobile communication device. Further, the processor can be configured to set up a bearer between the mobile communication device and the core network in accordance with the resource allocation initiated by the mobile communication device or the core network based at least in part on the at least one indicator.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
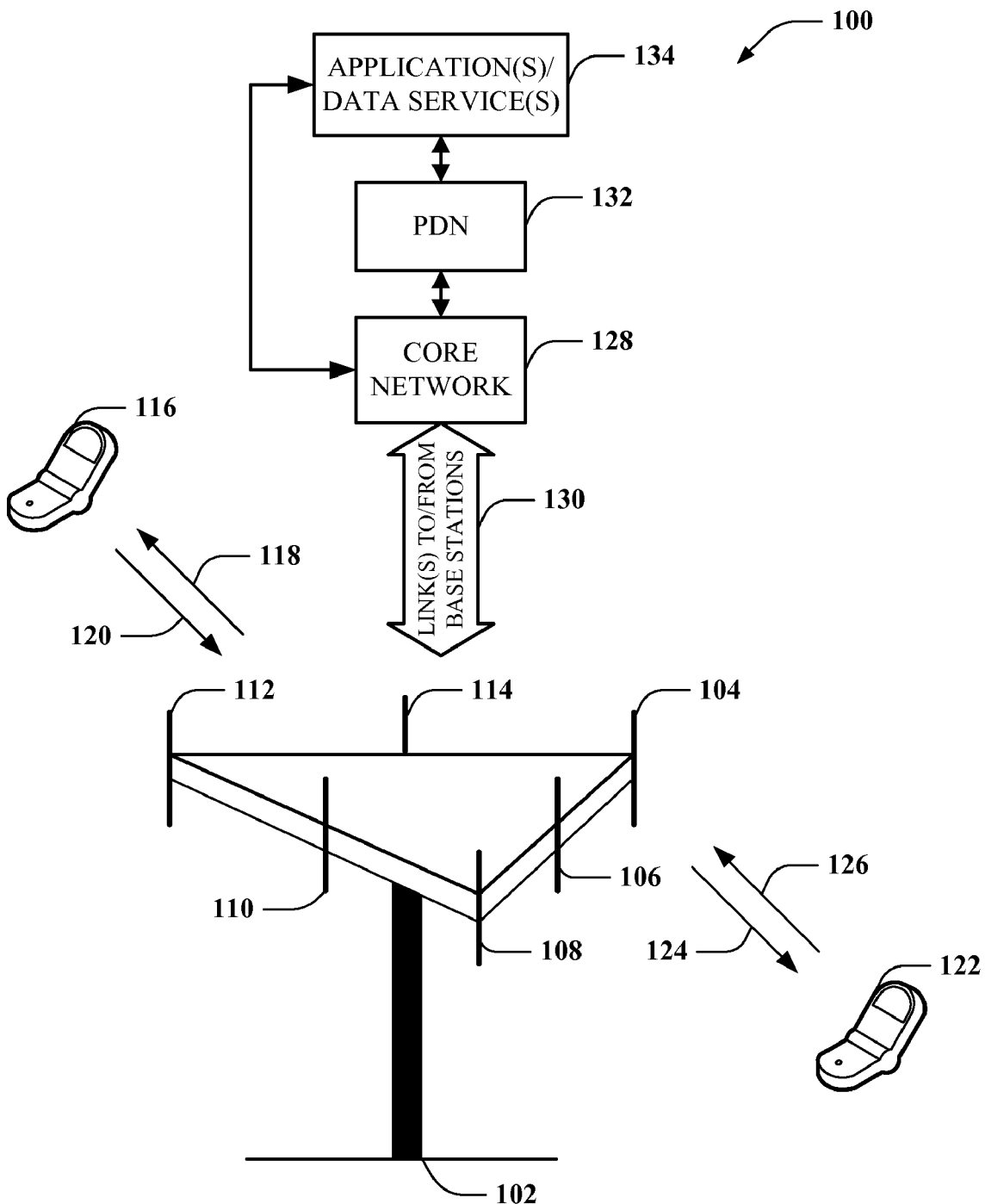
FIG. 1 illustrates a wireless communication system in accordance with various embodiments presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc., and/or may not include all of the devices, components, modules, etc., discussed in connection with the figures. A combination of these approaches may also be used.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B (e.g., evolved Node B, eNode B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates a wireless communication system 100 in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. It is to be appreciated that, while one base station 102 is depicted in FIG. 1, the disclosed subject matter can comprise more than one base station in the network, such as, for example, a serving base station 102 and one or more neighbor base stations 102.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In addition, FIG. 1 illustrates a core network 128 that can communicate with base station 102 through link(s) 130; it should be appreciated that core network 128 also can communicate with other base stations (not shown). Core network 128 typically can comprise substantially any component that generates and/or administers (e.g., schedules, retains communication records, policies, and so forth) packetized communications (e.g., communications based at least in part on internet protocol packets) such as data flows for UEs 116 or 122. Components, such as, for example, a serving gateway, a PDN gateway, and the like, that compose core network 128 can provide access to disparate packet data network(s) (PDN(s)) 132 which can facilitate access to application(s) and/or data service(s) 134. It should be appreciated that core network 128 also can access application(s) and/or data service(s) 134.

Conventionally, the Long Term Evolution (LTE)/Service Architecture Evolution (SAE) network allows a mixed mode operation for resource allocation (e.g., QoS) setup where either the UE or the network can initiate the process for setting up resources for an application. Evolved Packet Core (EPC)/Policy and Charging Control (PCC) architecture can allow a UE-initiated resource allocation request and a network (Policy and Charging Rules Function (PCRF)) initiated resource allocation request, wherein either type of request can result in a dedicated bearer setup between a UE and the network. In particular, in order for the network to dynamically initiate resource allocation for an application, the PCC support is needed. However, PCC is regarded as an optional feature within LTE/SAE and there is no clear indication whether a certain network supports PCC or not, even though the mixed mode operation is supported by the access network. Since both the UE and the network can initiate a resource allocation request, there potentially can be instances where both the UE and network attempt to initiate resource allocation requests with regard to a single application, which can result in multiple race conditions where the processes initiated by the UE can cross or conflict with the processes initiated by the network. In other cases, the UE may be expecting the network to initiate the resource allocation process while the network does not support PCC. As a result, the UE will not be able to receive the desired QoS for certain applications. The current standard does not provide guidance regarding determining whether the UE or the network is to initiate a resource allocation request with regard to an application and avoiding race conditions or lack of QoS that can result from usage of mixed mode operation. It is desirable to be able to utilize mixed mode of operation for resource allocation setup while avoiding race conditions or lack of QoS that can result from usage of mixed mode operation.

In accordance with various aspects, the subject innovation can employ an indicator that can facilitate determining when to utilize a network (NW)-initiated resource allocation and when to utilize a UE-initiated resource allocation. The subject innovation also can utilize another indicator, which can be generated and sent from the device (e.g., UE) side of the application 134 to the QoS management layer as well as the Non-Access Stratum (NAS) layer within the device (e.g., UE 116), to facilitate indicating whether NW-initiated resource allocation is a preferred mode of operation. The subject innovation can further employ yet another indicator, which can be transmitted from the network 128 to the UE (e.g., 116) to facilitate indicating whether the current network 128 supports PCC for NW-initiated resource allocation, where this indicator can imply that the appropriate architecture for network-initiated QoS, such as PCC, is available. The UE (e.g., 116) can be configured, based at least in part on the indicator received from the network 128 and the indicator from device side of the application 134, to either wait for the network 128 to initiate the resource allocation or to initiate the resource allocation itself. In an embodiment, the wireless communication system 100 can be configured such that NW-initiated resource allocation can be used when the device side of the application 134 indicates that the application 134 prefers NW-initiated resource-allocation operation and the current network 128 has indicated support of PCC for NW-initiated resource-allocation operation. In an aspect of the subject innovation, an indicator(s) can be a Q-bit word, wherein Q can be virtually any desired integer, or a predetermined value of a packet header field, and so forth.

Figure 2:
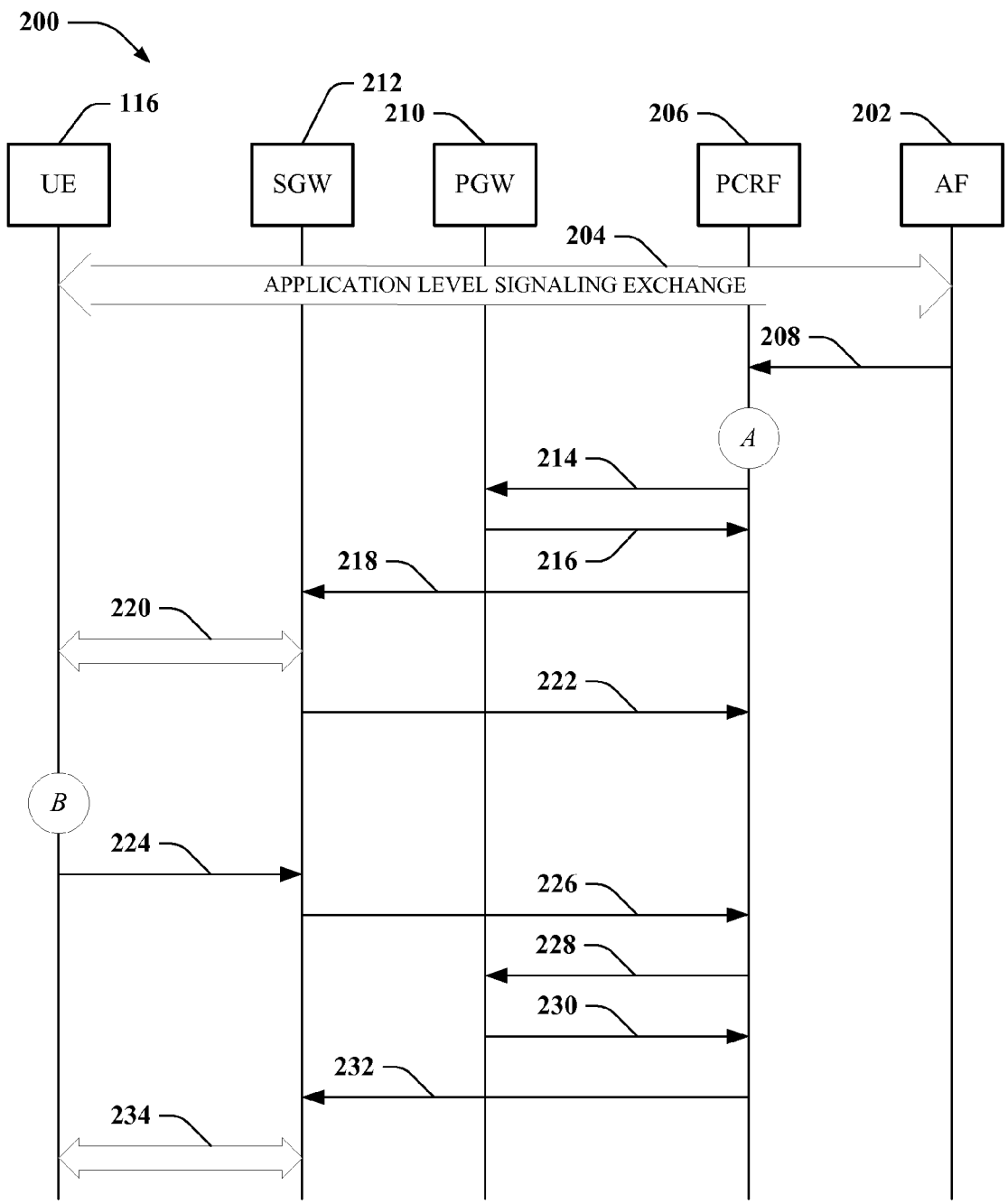
FIG. 2 illustrates an example call flow that illustrates user equipment (UE)-initiated and network (NW)-initiated resource allocation requests in accordance with various aspects of the disclosed subject matter.

Turning briefly to FIG. 2, illustrated is an example call flow 200 that illustrates UE-initiated and NW-initiated resource allocation requests in accordance with various aspects of the disclosed subject matter. In accordance with an aspect, the example call flow 200 can be employed by wireless communication system 100. In one aspect, example call flow 200 can include application level signaling being exchanged between a UE (e.g., 116) and an application function 202, such as depicted at reference numeral 204. The application function 202 can transmit service information related to the application to the PCRF 206, as illustrated at reference numeral 208.

In one aspect, in a NW-initiated resource setup (as depicted in Sequence A in FIG. 2), when the PCRF 206 receives the service information from the application function 202, the PCRF 206 can create authorized PCC/QoS rules in accordance with the received service information, where the PCC/QoS rules can comprise information that can facilitate enabling detection of service data flow and providing parameters for policy, charging, and QoS control. The PCRF 206 can transmit the authorized PCC rules to the Packet Data Network Gateway (PGW) 210 (as depicted at reference numeral 214 in FIG. 2). The PGW 210 can transmit an acknowledgement to the PCRF 206 to indicate that the authorized PCC rules have been received, as illustrated at reference numeral 216. At the same time, if the SGW performs bearer binding and event reporting function, the PCRF 206 can transmit Gateway (GW) control and QoS rules to the SGW 212, as depicted at reference numeral 218. The QoS rules can comprise QoS parameters and other information that can facilitate enabling detection of service data flow, performing bearer binding, and verifying uplink bearer binding. The SGW 212 and UE 116 can communicate with each other to facilitate setting up dedicated bearer between the UE 116 and the core network 128 in accordance with the received QoS rules and GW control, as depicted at reference numeral 220. The SGW 212 also can transmit an acknowledgement to the PCRF 206 to acknowledge that information regarding the GW control and QoS rules was received, as depicted at reference numeral 222.

In accordance with another aspect, in a UE-initiate resource allocation (as depicted in Sequence B in FIG. 2), the PCRF 206 receives the service information from the application function 202, as illustrated at reference numeral 208. The UE 116 can transmit a resource request (e.g., bearer resource allocation request) to the network (e.g., 128), where the resource request can be received by the SGW 212, as illustrated at reference numeral 224. Based at least in part on the received resource request, the SGW 212 can transmit a request for GW control and QoS rules to the PCRF 206, as illustrated at reference numeral 226, where the PCRF 206 can authorize the received request. The PCRF 206 can transmit authorized PCC rules to the PGW 210 (as depicted at reference numeral 228 in FIG. 2). The PGW 210 can transmit an acknowledgement to the PCRF 206 to indicate that the authorized PCC rules have been received, as illustrated at reference numeral 230. At the same or substantially the same time, in response to the request as illustrated at reference numeral 226, the PCRF 206 can transmit GW control and QoS rules to the SGW 212, as depicted at reference numeral 232. The SGW 212 and UE 116 can communicate with each other to facilitate setting up dedicated bearer between the UE 116 and the core network 128 in accordance with the received QoS rules and GW control, as depicted at reference numeral 234.

It is noted that for a single application, since both UE-initiated request and NW-initiate request can be available, the application can make use of either UE-initiated resource allocation or NW-initiated resource allocation. Conventionally, for example, a UE can roam across various networks that may support only one resource allocation method, which can lead to communication deterioration or negation (e.g., due in part to race conditions). In addition, conventionally, an available UE-initiated request procedure(s) and NW-initiated procedure(s) can interact adversely: race conditions (e.g., flawed logic) can arise from mixed utilization of resource allocation procedures within a single application. As another example, conventionally there potentially can be multiple race conditions when NW-initiated procedure (e.g., procedures described with regard to reference numerals 214-222) is started in parallel, or concurrently, with UE-initiated procedures (e.g., procedures described with regard to reference numerals 224-234). For instance, the NW-initiated procedures, such as the PCC rule provision, PCC rule provision acknowledgement, and/or GW control and QoS rule provision (e.g., reference numerals 214, 216, and/or 218) may cross with the UE-initiated procedure, such as the GW control and QoS rule request (e.g., reference numeral 226); and/or a NW-initiated procedure, such as the dedicated bearer setup (e.g., reference numeral 220) may cross with a bearer resource allocation request (e.g., reference numeral 224). As another example, the application on the UE may be preconfigured to prefer the NW-initiated resource allocation. If the UE moves to a network where the PCC for NW-initiated resource allocation is not available, the UE will either not receive the desired QoS for communication or wait for a long time before realizing that the network is not setting up QoS.

Referring again to FIG. 1 and system 100, in accordance with various aspects of the disclosed subject matter, system 100 can define interaction and maintain clean separation of UE-initiated QoS procedures and NW-initiated QoS procedures for a single application. System 100 can employ specified indicators that can be communicated between the UE 116 and the network 128, and between specified components or layers within the network 128, to allow a clean indication of when to employ NW-initiated QoS (e.g., NW-initiated resource allocation) and when to use UE-initiated QoS. In addition, the subject innovation can facilitate managing interactions within a UE 116 between an application, a signaling layer, and a radio layer.

In an aspect of the subject innovation, applications can be classified into at least two types:

Type 1 application(s), which only utilize UE-initiated resource allocation. Type 1 application(s) can be network operator controlled or not operator controlled (e.g., a third party data service provider).

Type 2 application(s) can utilize NW-initiated resource allocation as a preferred allocation method. Typically, Type 2 applications can be operator controlled applications. Additionally, in an aspect, such application(s) also supports UE-initiated resource allocation, for example, for roaming purposes, when the visited network does not support function needed for NW-initiated resource allocation. For Type 2 application(s), the UE and the Home PCRF can be configured with information regarding the preference for utilizing NW-initiated resource allocation.

In another aspect of the subject innovation, coordination that can utilize signaling indication(s) and operator policy is provided between the UE 116 and network 128 for Type 2 application(s). The signaling indication(s) can be stored in a data store within a core network 128 and operator policy can be stored in a policy store within the core network 128. Additionally, such indication(s) can facilitate allowing a clean separation of NW-initiated QoS and UE-initiated QoS.

Figure 3:
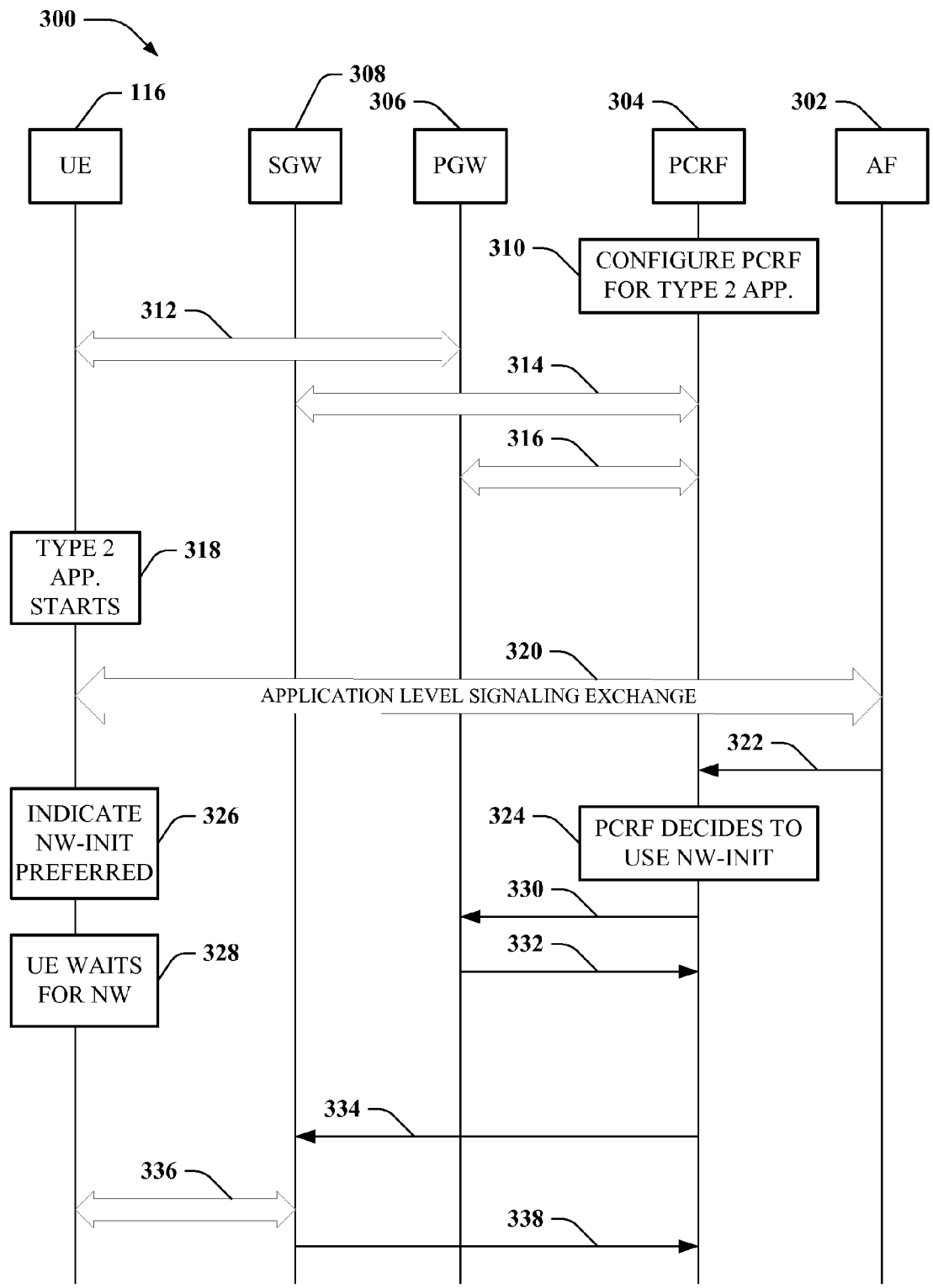
FIG. 3 depicts an example call flow that illustrates an example technique that can facilitate managing NW-initiated resource allocation and UE-initiated resource allocation in accordance with aspect(s) of the subject innovation.

Referring to FIG. 3, depicted is an example call flow 300 that illustrates an example technique that can facilitate managing NW-initiated resource allocation and UE-initiated resource allocation in accordance with aspect(s) of the subject innovation. In an aspect, system 100 can employ the techniques disclosed with regard to call flow 300 to facilitate managing NW-initiated resource allocation (e.g., QoS) and UE-initiated resource allocation. Associated with call flow 300, there can be an application function 302, PCRF 304, PGW 306, and SGW 308, which can be part of or associated with a core network (e.g., 128) in a wireless network environment, and a UE (e.g., 116) that can desire to communicate with other communication devices in the wireless network environment.

In an aspect, the UE 116 and the PCRF 304 can be configured or provisioned for Type 2 application, which utilizes NW-initiated resource allocation as a preferred allocation technique, as depicted at reference numeral 310. When the UE 116 connects to the access network, the PGW 306 can transmit an indicator to the UE 116 that indicates that PCC for NW-initiated resource allocation is supported, as depicted at reference numeral 312. As desired, this indication can be combined with an indication that the access network has the capability for mixed mode (both UE-initiate resource allocation and NW-initiated resource allocation) operation or can be an independent indicator. In another aspect, the SGW 308 can communicate with the PCRF 304 to facilitate setting up a GW control session, where the SGW 308 can transmit an indicator to the PCRF 304 that can indicate that NW-initiated QoS is supported, as illustrated at reference numeral 314. The PCRF 304 and PGW 306 can communicate with each other to facilitate setting up an Internet Protocol connectivity access network (IP-CAN) session, where, as part of the exchange of information, the PGW 306 can transmit an indicator to the PCRF 304 that can indicate that the PCC for NW-initiated QoS is supported, as depicted at reference numeral 316. At this point, the Type 2 application can start, as depicted at reference numeral 318.

In another aspect, when the Type 2 application is started, application level signaling can be exchanged between the application function 302 and the UE 116, as illustrated at reference numeral 320. The application function 302 can transmit service information, which in part can indicate that a Type 2 application is being employed, to the PCRF 304, as illustrated at reference numeral 322. The PCRF 304 can determine that NW-initiated QoS is to be utilized based at least in part on the PCRF being configured or provisioned for Type 2 applications, the indicator from the GW control session setup that indicates PCC for NW-initiated QoS is supported (and/or the indicator from the IP-CAN control session setup that indicates PCC for NW-initiated QoS is supported), and the service information that indicates that the application is a Type 2 application, as depicted at reference numeral 324.

In another aspect, the UE-side of the application can indicate (e.g., using a NW-init preferred indicator) to the QoS management function and NAS layer within the UE 116 that NW-initiated QoS is preferred, as illustrated at reference numeral 326. In accordance with an embodiment, as desired, the UE 116 can employ an Application Programming Interface (API), where the NW-init preferred indicator can be exposed via the API (e.g., an open API). Exposing the NW-init preferred indicator and/or other desired information via the API can facilitate application developers to create applications that can indicate to the QoS management function whether NW-init resource allocation is preferred over UE-init resource allocation or not via the API. In an aspect, the UE 116 can determine that NW-initiated QoS is to be utilized based at least in part on the PCC support indicator, which indicates that PCC for NW-initiated QoS is supported and was received from the PGW 306, and the NW-init preferred indicator from the UE-side of the application, which indicates that NW-initiated QoS is preferred, and the UE 116 can wait for the network to initiate QoS, as illustrated at reference numeral 328. The PCRF 304 can transmit the desired PCC rules to the PGW 306 (as depicted at reference numeral 330) (or alternatively the SGW 308). The PGW 306 (or alternatively the SGW 308) can transmit an acknowledgement to the PCRF 304 to indicate that the desired PCC rules have been received, as illustrated at reference numeral 332. In response to the acknowledgement, the PCRF 304 can transmit GW control and QoS rules to the SGW 308, as depicted at reference numeral 334. The SGW 308 and UE 116 can communicate with each other to facilitate setting up dedicated bearer between the UE 116 and the core network 128 in accordance with the received QoS rules and GW control, as depicted at reference numeral 336. The SGW 308 also can transmit an acknowledgement to the PCRF 304 to acknowledge that information regarding the GW control and QoS rules was received, as depicted at reference numeral 338.

It is to be appreciated and understood that, in another aspect, if the UE 116 does not receive an indicator from the PGW 306 that PCC for NW-initiated resource allocation is supported. Then even if the UE 116 receives indication, as illustrated in 326, from the application the preferred mode of operation for Type 2 application is NW-initiated resource allocation, the UE can determine that UE-initiated resource allocation is to be used and can follow the procedures as described in sequence B (reference numerals 224-234) in FIG. 2, call flow 200, to perform UE-initiated resource allocation.

It is also to be appreciated and understood that, in another aspect, if the UE 116 does not receive an indicator from the application that indicates that NW-initiated resource allocation is the preferred mode of operation (or receives an indicator that indicates that the application is a Type 1 application or that NW-initiated resource allocation is not the preferred mode of operation) or does not receive an indicator from the core network 128 that indicates the network supports PCC for NW-initiated resource allocation (or receives an indicator from the core network 128 that indicates that the network does not support PCC for NW-initiated resource allocation), the UE 116 can determine that the UE can initiate the request for resource allocation, and the UE 116 can generate and transmit a request to the SGW 308 in the core network 128 to facilitate establishing the desired dedicated bearer between the UE 116 and the core network 128, e.g., following the procedures as described in sequence B (reference numeral 224-234) in FIG. 2, call flow 200.

By controlling when NW-initiated resource allocation and UE-initiated resource allocation is utilized with regard to an application, the subject innovation can facilitate eliminating or at least reducing undesirable race conditions that may otherwise arise if the NW-initiated resource allocation and UE-initiated resource allocation are employed at the same time. The subject innovation also can facilitate efficiently establishing QoS for a mobile device desiring to communicate in a wireless communication environment, for example, in case when PCC for NW-initiated resource allocation is not supported by the network even if NW-initiated resource allocation is the preferred mode.

Figure 4:
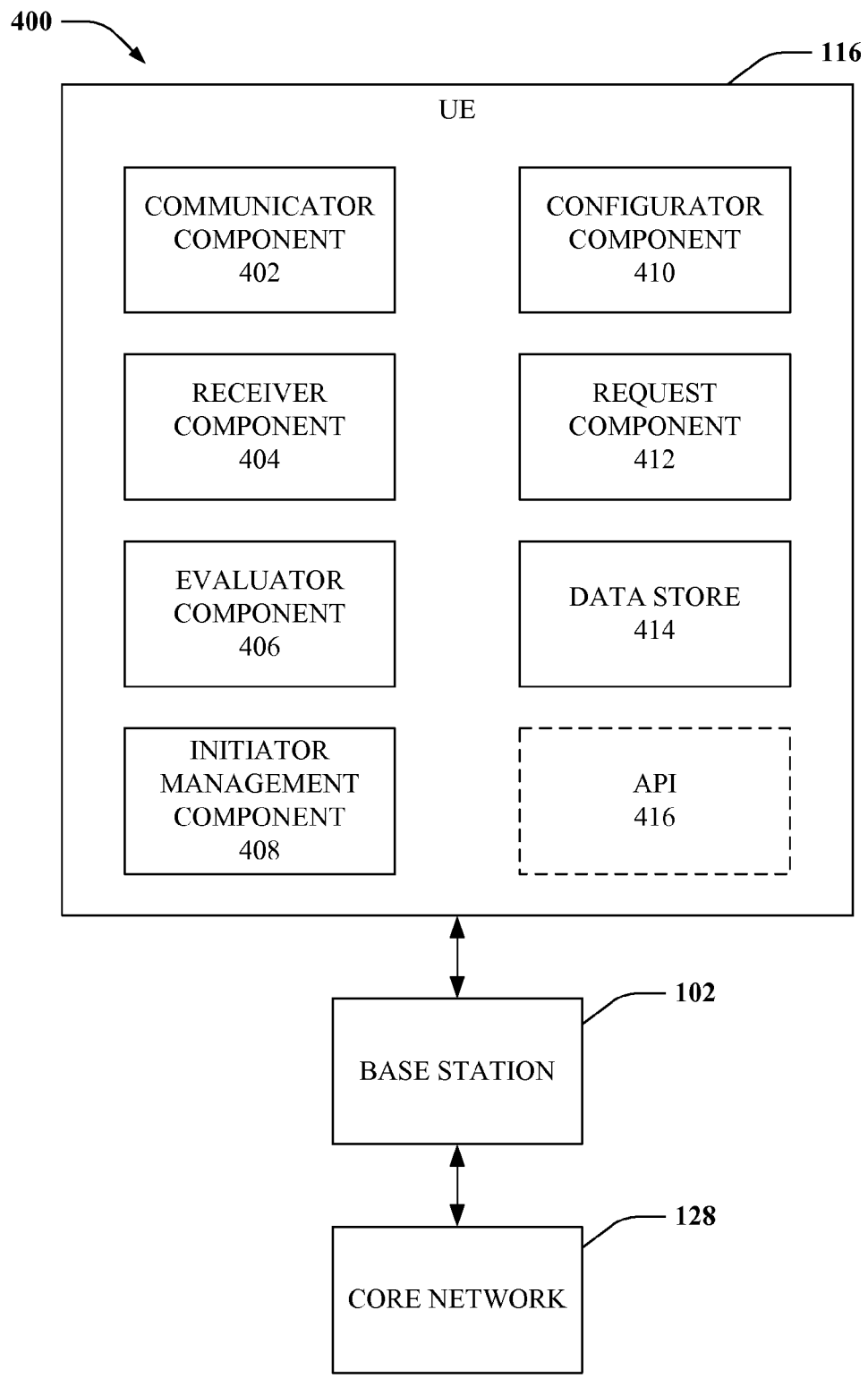
FIG. 4 illustrates a wireless communication system that can facilitate management of NW-initiated resource allocation and UE-initiated resource allocation in accordance with various embodiments presented herein.

Referring to FIG. 4, illustrated is a wireless communication system 400 that can facilitate management of NW-initiated resource allocation and UE-initiated resource allocation in accordance with various embodiments presented herein. System 400 can include a UE 116 that can be a mobile communication device, which can be connected (e.g., wirelessly connected) to a base station 102. The base station 102 can be connected to a core network 128 in a wireless communication environment. It is to be appreciated and understood that the base station 102, UE 116, and core network 128 each can be the same or similar as, or can comprise the same or similar functionality as, respective components, such as more fully described herein, for example, with regard to system 100, call flow 200, and call flow 300.

In accordance with an aspect, the UE 116 can include a communicator component 402 which can be utilized to facilitate transmitting data to and/or receiving data from the base station 102 and/or another communication device (e.g., mobile phone, computer) (not shown) in the wireless communication environment. For instance, the communicator component 402 can facilitate communication of control information and/or data between the UE 116 and the base station 102. In another aspect, the UE 116 can comprise a receiver component 404 that can receive an indicator(s) and/or other information that can indicate whether the UE 116 is to initiate resource allocation (e.g., QoS) for the UE 116 or the core network 128 is to initiate resource allocation for the UE 116 and/or can indicate whether the network can support PCC for NW-initiated resource allocation.

The UE 116 also can contain an evaluator component 406 that can evaluate information, such as a PCC support indicator, a NW-init support indicator and/or a NW-init preferred indicator, to facilitate determining whether the UE 116 is to initiate resource allocation for the UE 116 or the core network 128 is to initiate resource allocation for the UE 116. In another aspect, the UE 116 can include an initiator management component 408 that can determine whether the UE 116 is to initiate resource allocation for the UE 116 or the core network 128 is to initiate resource allocation for the UE 116 based at least in part on the evaluation of information, including received information, such as a PCC support indicator a NW-init support indicator, information indicating a type of application (e.g., Type 1 application, Type 2 application) being employed with the UE 116, and/or a NW-init preferred indicator (e.g., which can be generated by UE-side of the application and provided to components associated with the UE 116). The initiator management component 408 can control the UE 116 to have the UE 116 initiate resource allocation or not initiate resource allocation for the UE 116 based at least in part on the received indicator(s) or other information.

In still another aspect, the UE 116 also can contain a configurator component 410 that can facilitate configuring the UE 116, such as components therein, for example, to initiate resource allocation for the UE 116 when the UE-initiated resource allocation is desired, and/or to establish QoS for the UE 116 in accordance with QoS rules. The UE 116 can further include a request component 412 that can generate a request for resource allocation when UE-initiated resource allocation is desired, where the request for resource allocation can be communicated to the core network 128 via the base station 102 by the communicator component 402.

In another aspect, the UE 116 can comprise a data store 414 which can store information and/or code that can facilitate operation of the UE 116, where the information and/or code can comprise, for example, information and/or code that can facilitate enabling the UE 116 to communicate with other communication devices, information and/or code that can facilitate evaluating data (e.g., indicator(s)), information and/or code that can facilitate controlling whether a request for resource allocation is to be generated and transmitted, information and/or code that can facilitate configuring the UE 116 to operate as desired, etc.

In accordance with an aspect, the data store 414 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 414 is intended to comprise, without being limited to, these and any other suitable types of memory.

In accordance with an embodiment, the UE 116 optionally can include an API 416 that can be utilized to facilitate access to or provision of certain information, such as the NW-init preferred indicator. Entities, such as application developers, can develop applications by using the API 416 to indicate whether NW-init resource allocation is preferred or not.

Figure 5:
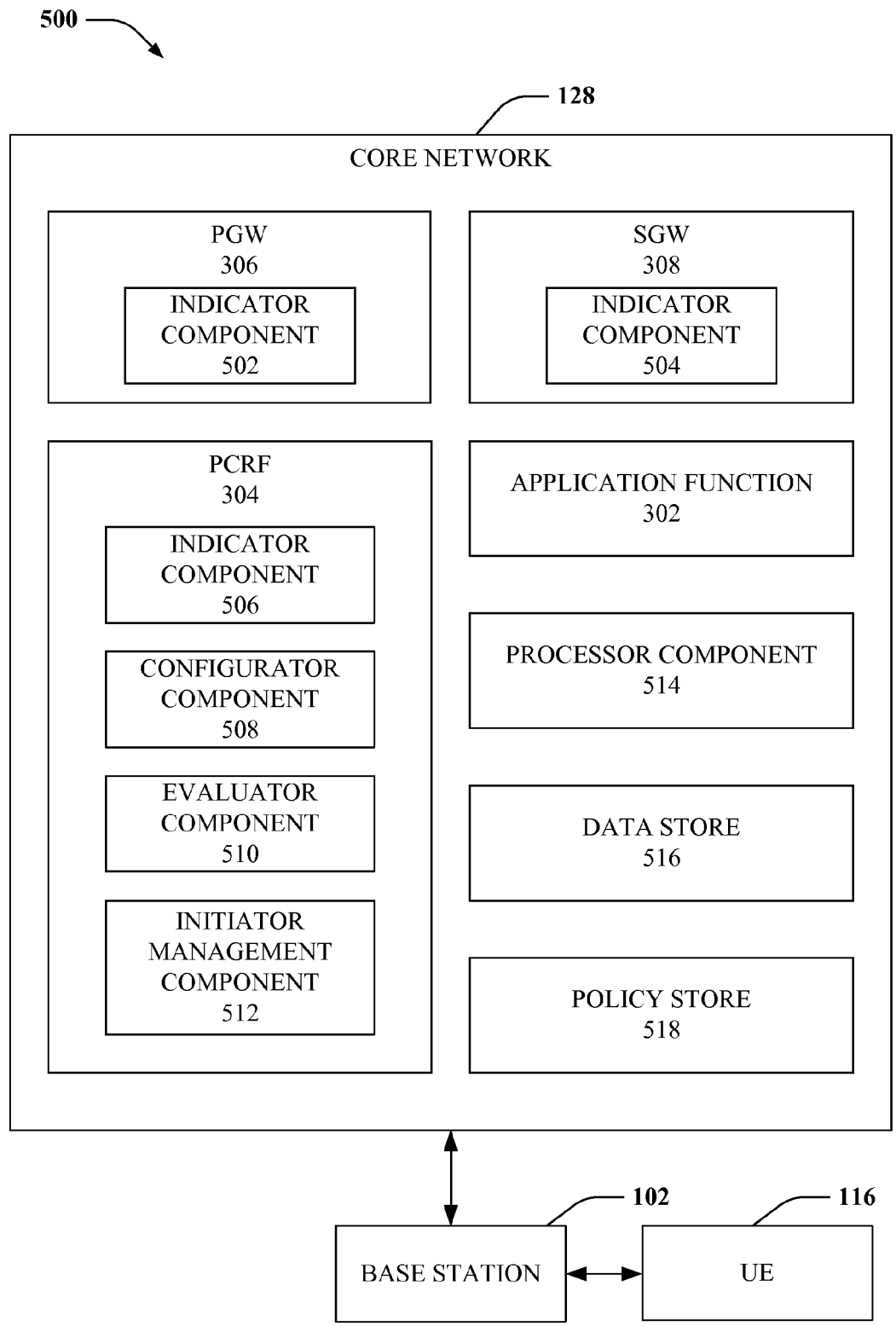
FIG. 5 depicts another wireless communication system that can facilitate management of NW-initiated resource allocation and UE-initiated resource allocation in accordance with various embodiments presented herein.

Turning to FIG. 5, depicted is another wireless communication system 500 that can facilitate management of NW-initiated resource allocation and UE-initiated resource allocation in accordance with various embodiments presented herein. In an aspect, the system 500 can comprise a UE 116 that can be a mobile communication device, which can be connected (e.g., wirelessly connected) to a base station 102. The base station 102 can be connected to a core network 128 in a wireless communication environment. It is to be appreciated and understood that the base station 102, UE 116, and core network 128 each can be the same or similar as, or can comprise the same or similar functionality as, respective components, such as more fully described herein, for example, with regard to system 100, call flow 200, call flow 300, and system 400.

In an aspect, the core network 128 can include a PGW 306 that can be a node in the core network 128 and can facilitate communicating or routing information between the core network 128 and the UE 116. The PGW 306 can comprise an indicator component 502 which can communicate an indicator(s), such as a PCC support indicator and/or a NW-init support indicator, to the UE 116 to facilitate indicating to the UE 116 whether the network supports PCC for NW-initiated resource allocation. The core network 128 also can include a SGW 308 that can facilitate communicating or routing information between the core network 128 and the UE 116. The SGW 308 can comprise an indicator component 504 that can receive or provide an indicator(s), such as a PCC support indicator and/or a NW-init support indicator, from or to other components in the core network 128 or components outside the core network 128 to facilitate communicating information to the UE 116 regarding whether NW-initiated resource allocation is supported and/or preferred.

In another aspect, the core network 128 can contain a PCRF 304 that can facilitate establishing QoS for mobile communication devices, such as the UE 116. The PCRF 304 can generate and transmit QoS rules and PCC rules to other components, such as the PGW 306, in the core network 128 to facilitate setting up a bearer between the UE 116 and the core network 128. The PCRF 304 can include an indicator component 506 that can receive an indicator(s), such as an indicator that specifies a type of application that is being employed with the UE 116 from the application function 302 to facilitate determining whether UE-initiated resource allocation or NW-initiated resource allocation is to be employed. The PCRF 304 also can contain a configurator component 508 that can facilitate configuring the PCRF 304 to function in accordance with a Type 2 application or a Type 1 application depending in part on whether the application function 302 is employing a Type 2 application or Type 1 application. The configurator component 508 also can facilitate configuring the PCRF 304 to employ NW-initiated resource allocation or to allow the UE 116 to request resource allocation (e.g., UE-initiated request) based at least in part on the type of application being utilized with the UE 116 and whether the current network supports NW-initiated resource allocation.

The PCRF 304 also can employ an evaluator component 510 that can evaluate data, such as service information, which can indicate the type of application desired to be used with the UE 116, indicate whether NW-initiated resource allocation is preferred, and/or whether the current network (e.g., 128) can support PCC for NW-initiated resource allocation to facilitate determining whether to employ NW-initiated resource allocation. The PCRF 304 also can employ an initiator management component 512 that can facilitate controlling whether the core network 128 is to initiate resource allocation or whether the UE is to initiate resource allocation based at least in part on the evaluation by the evaluator component 510.

In yet another aspect, the core network 128 can include an application function 302 that can be an application function entity and can provide the PCRF 304 with information, such as service information, to facilitate policy establishment and charging control. The service information can indicate to the PCRF 304, for example, whether the application function 302 is employing a Type 2 application or a Type 1 application.

In still another aspect, the core network 128 can comprise a processor component 514 that can comprise one or more processors that can facilitate processing data and controlling data flow in the core network 128. It is to be appreciated and understood that, while the processor component 514 is depicted as being a separate component in the core network 128, the subject innovation is not so limited, and one or more processors of the processor component 128 can be contained within another component(s) (e.g., PGW 306, SGW 308, etc.) in the core network 128, as desired.

In accordance with an aspect, the core network 128 can include a data store 516 that can store and provide data to other components associated with the core network 128. The data store 514 can contain data related to establishing communication with a UE (e.g., 116), controlling voice or data communication between communication devices, indicator(s) (e.g., PCC support indicator, NW-init support indicator), determining whether NW-initiated resource allocation or UE-initiated resource allocation is to be employed with regard to a UE 116, evaluating an indicator(s) or other information, etc. The core network 128 also can contain a policy store 518 that can store and provide data related to operator policy.

In another aspect, the data store 516 and policy store 518 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 516 and policy store 518 is intended to comprise, without being limited to, these and any other suitable types of memory.

Referring to FIGS. 6-9, methodologies relating to efficiently managing NW-initiated resource allocation and UE-initiated resource allocation in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 6:
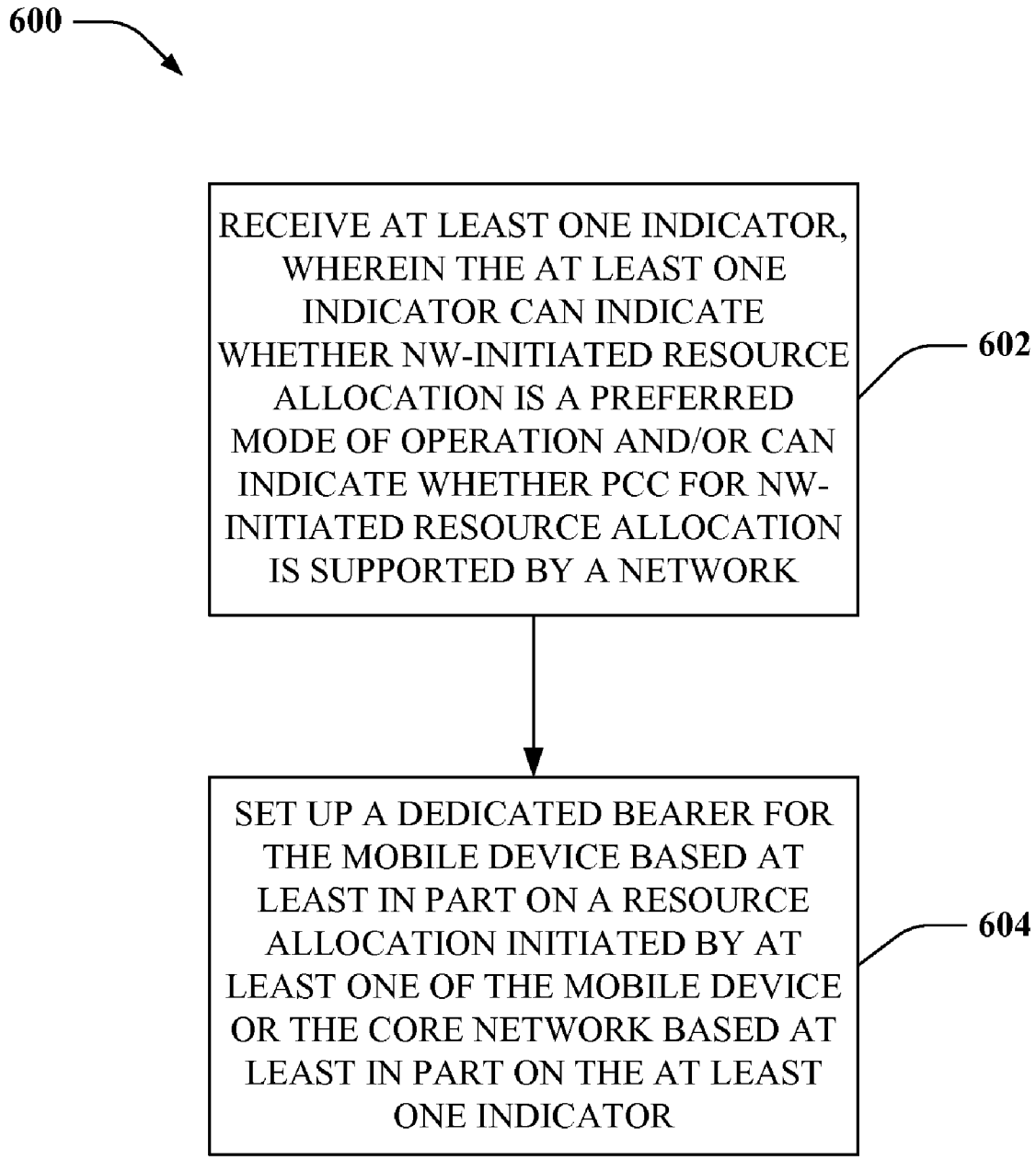
FIG. 6 illustrates an example methodology that can facilitate managing NW-initiated resource allocation and UE-initiated resource allocation in a wireless communication environment to facilitate communications associated with the UE in a wireless communication environment in accordance with an aspect of the disclosed subject matter.

With reference to FIG. 6, illustrated is an example methodology 600 that can facilitate managing NW-initiated resource allocation and UE-initiated resource allocation in a wireless communication environment to facilitate communications associated with the UE in a wireless communication environment in accordance with an aspect of the disclosed subject matter. At 602, at least one indicator can be received, wherein the at least one indicator can indicate whether NW-initiated resource allocation is a preferred mode of operation and/or can indicate whether a network supports PCC for NW-initiated resource allocation. In an aspect, a mobile device (e.g., 116) can desire to communicate, for example, with other communication devices, in a wireless communication environment. To facilitate communicating in the wireless communication environment, the mobile device 116 can communication with a core network 128 via a base station 102 to facilitate setting up a dedicated bearer between the mobile device 116 and the core network 128. In an aspect, the mobile device 116 can desire to determine whether the mobile device 116 is to initiate resource allocation or the core network 128 is to initiate resource allocation for the mobile device 116. A desired number of indicators can be employed and communicated to the mobile device 116, and the mobile device can facilitate determining whether the mobile device 116 is to initiate resource allocation or the network 128 is to initiate resource allocation for the mobile device 116 based at least in part on the indicator(s) received by the mobile device 116. In another aspect, components (e.g., PCRF 304) of the core network 128 can employ an indicator(s) that can indicate whether PCC for NW-initiated resource allocation is supported, where the indicator(s) can be provided to the UE 116, and/or the UE-side of the application can employ an indicator, such as a NW-init preferred indicator, that can indicate whether NW-initiated resource allocation is preferred, and the NW-init preferred indicator can be provided to other components of the mobile device 116, to facilitate determining whether to employ NW-initiated resource allocation or UE-initiated resource allocation.

Referring again to the mobile device 116, for example, the mobile device 116 can receive an indicator, which indicates that NW-initiated resource allocation (e.g., NW-initiated QoS) is preferred, from the UE-side of an application being utilized. For instance, NW-initiated resource allocation can be preferred when a Type 2 application is being utilized. As another example, the mobile device 116 can receive an indicator (e.g., PCC support indicator), which can indicate that the current network can support NW-initiated resource allocation and PCC is supported, from a PGW (e.g., 306) in the core network 128.

At 604, a dedicated bearer can be setup for the mobile device based at least in part on a resource allocation initiated by at least one of the mobile device or the core network based at least in part on the at least one indicator. In an aspect, a dedicated bearer can be setup between the mobile device 116 and the core network 128, where the resource allocation can be initiated by the mobile device 116 or the core network 128 depending in part on the received indicator(s). If the mobile device 116 receives an indicator that indicates NW-initiated resource allocation is preferred from the UE-side of the application and an indicator that indicates the current network supports NW-initiated resource allocation and PCC is supported, the mobile device 116 can determine that the core network 128 is to initiate resource allocation for the mobile device 116, and the mobile device 116 can wait and allow the network to initiate the resource allocation. Based at least in part on the resource allocation request initiated by the core network 128, the core network 128 can facilitate transmitting information related to resource allocation to the mobile device 116, and the mobile device 116 can utilize the received information to facilitate setting up a dedicated bearer between the mobile device 116 and the core network 128.

If the mobile device 116 does not receive an indicator that indicates NW-initiated resource allocation is a preferred mode of operation (or receives an indicator that indicates the NW-initiated resource allocation is not a preferred mode of operation) or does not receive an indicator that indicates the current network supports NW-initiated resource allocation (or receives an indicator that indicates the current network does not support NW-initiated resource allocation) or does not receive an indicator that indicates the current network supports PCC (or receives an indicator that the current network does not support PCC), the mobile device 116 can determine that the mobile device 116 is to initiate resource allocation for the mobile device 116, and the mobile device 116 can transmit a resource allocation request to the core network 128. Based at least in part on the resource allocation request initiated by the mobile device 116, the core network 128 can facilitate transmitting information related to resource allocation to the mobile device 116, and the mobile device 116 can utilize the received information to facilitate setting up a dedicated bearer between the mobile device 116 and the core network 128.

Figure 7:
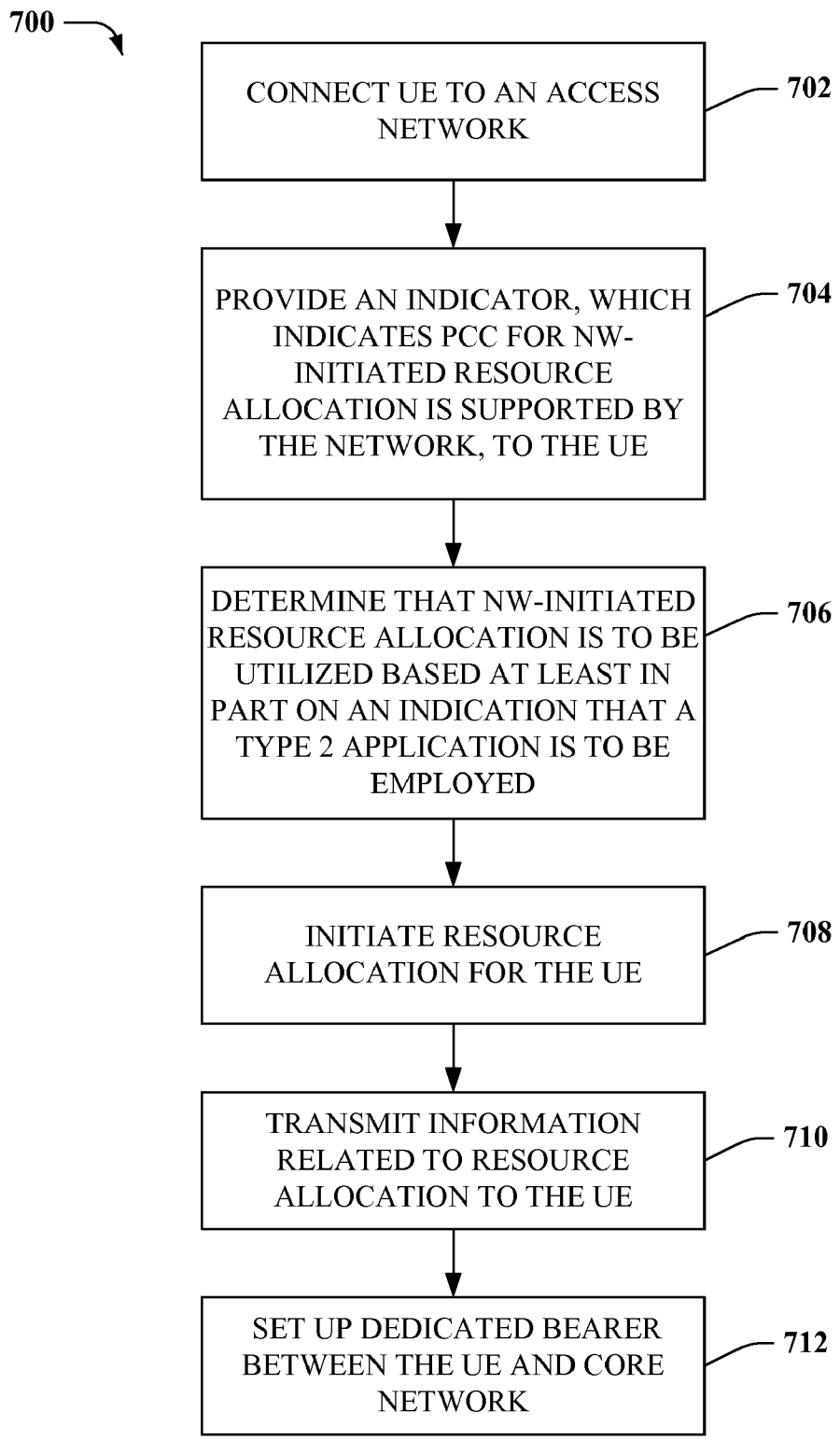
FIG. 7 depicts another example methodology that can facilitate managing NW-initiated resource allocation and UE-initiated resource allocation in a wireless communication environment to facilitate communications associated with the UE in a wireless communication environment in accordance with an aspect of the disclosed subject matter.

FIG. 7 depicts another example methodology 700 that can facilitate managing NW-initiated resource allocation and UE-initiated resource allocation in a wireless communication environment to facilitate communications associated with the UE in a wireless communication environment in accordance with an aspect of the disclosed subject matter. At 702, a UE can be connected to an access network. In an aspect, a UE (e.g., 116) can desired to communicate in a wireless network environment associated with the access network, which can be associated with a core network 128. The core network 128 can facilitate connecting the UE 116 to the access network via a base station 102 to facilitate enabling the UE 116 to communicate, for example, with other communication devices associated with the wireless network environment.

At 704, an indicator (e.g., PCC indicator), which can indicate that PCC for NW-initiated resource allocation (e.g., NW-initiated QoS) is supported by the network, can be provided (e.g., transmitted) to the UE. In an aspect, a PGW (e.g., 306) in the core network 128 can transmit an indicator, such as a PCC support indicator, to the UE 116, where the indicator can indicate to the UE 116 that PCC for NW-initiated resource allocation is supported by the current network. For instance, NW-initiated resource allocation can be supported by the network when the PCRF 304 associated with the network is configured or provisioned for Type 2 applications.

At 706, a determination can be made that NW-initiated resource allocation is to be utilized based at least in part on an indication that a Type 2 application is to be employed. In an aspect, an application function (e.g., 302) can provide service information to the PCRF (e.g., 304), where the service information can indicate that a Type 2 application is to be employed with the UE 116. When a Type 2 application is employed, it can be desirable to utilize NW-initiated resource allocation, except in certain instances, such as, for example, in certain instances when a UE is roaming and the visited network does not support PCC.

In another aspect, to facilitate ensuring that the UE 116 and the core network 128 are in accord with each other as to which of them is to initiate resource allocation, the UE 116 can receive a NW-init preferred indicator from the UE-side of the application, where the indicator can be set to a specified value to indicate to the UE 116 that NW-initiated resource allocation is a preferred mode of operation by the core network 128, as opposed to UE-initiated resource allocation. The UE 116 can determine that NW-initiated resource allocation is to be employed with regard to this application, and the UE 116 can wait for the network 128 to initiate resource allocation and communicate with the UE 116.

At 708, resource allocation for the UE can be initiated (e.g., by the core network). In an aspect, the core network 128 can initiate resource allocation for the UE 116 to facilitate setting up a dedicated bearer between the UE 116 and the core network 128. To facilitate setting up the dedicated bearer, the PCRF 304 can communicate PCC rules to the PGW 306, which can provide a PCC rule acknowledgement to the PCRF 304, and the PCRF 304 can provide GW control and QoS rules to the SGW 308, which can provide a GW control and QoS rule acknowledgement to the PCRF 304.

At 710, information related to resource allocation can be transmitted to the UE to facilitate setting up the dedicated bearer between the UE and the core network. In an aspect, the SGW 308 can communicate with the UE 116 to transmit the resource allocation information to the UE 116. At 712, the dedicated bearer can be set up between the UE and the core network based at least in part on the resource allocation information. In an aspect, the received resource allocation information can be utilized to facilitate establishing the dedicated bearer between the UE 116 and the core network 128 to facilitate desired communication by the UE 116 in the wireless communication environment.

Figure 8:
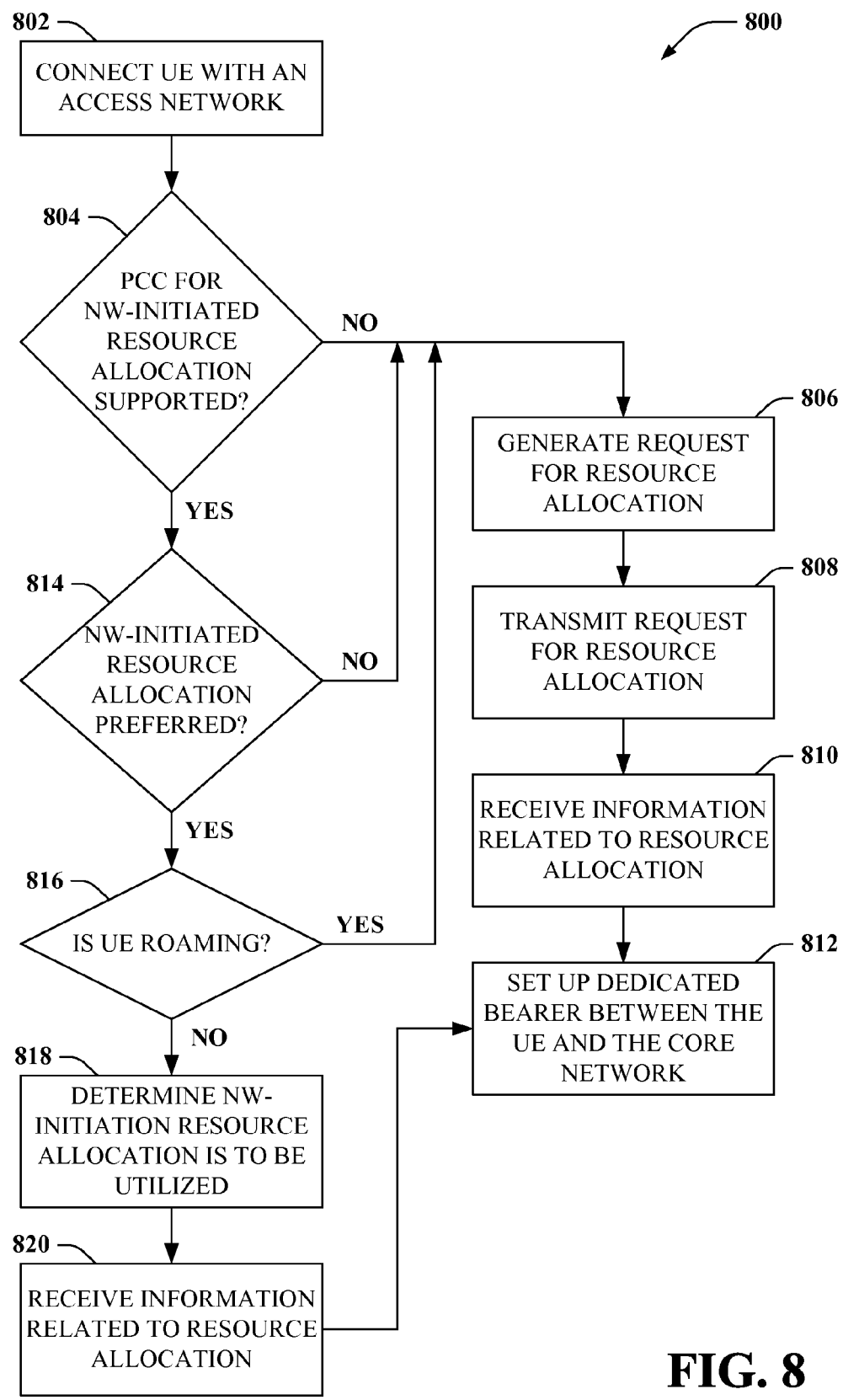
FIG. 8 illustrates another example methodology that can facilitate managing NW-initiated resource allocation and UE-initiated resource allocation in a wireless communication environment to facilitate communications associated with the UE in a wireless communication environment in accordance with an aspect of the disclosed subject matter.

FIG. 8 illustrates another example methodology 800 that can facilitate managing NW-initiated resource allocation and UE-initiated resource allocation in a wireless communication environment to facilitate communications associated with the UE in a wireless communication environment in accordance with an aspect of the disclosed subject matter. At 802, a UE can be connected with an access network. In an aspect, a UE (e.g., 116) can desire to communicate in a wireless communication environment, and the UE 116 can connect, via a base station 102, with an access network associated with the core network 128 to facilitate communicating with other communication devices in the wireless communication environment.

At 804, a determination can be made regarding whether NW-initiated resource allocation is supported by the current network. In an aspect, the UE 116 can receive an indicator (e.g., PCC support indicator), which can indicate whether PCC for NW-initiated resource allocation is supported by the current network. The UE 116 can determine whether NW-initiated resource allocation is supported by the network based at least in part on a received indicator(s) (e.g., NW-init support indicator, PCC support indicator). If it is determined that NW-initiated resource allocation is not supported by the current network, at 806, a request for resource allocation can be generated. In an aspect, if the received indicator (e.g., PCC support indicator) indicates that NW-initiated resource allocation is not supported by the current network (or, alternatively, if no PCC support indicator is received by the UE 116, where such indicator can be set to indicate that the current network supports PCC for NW-initiated resource allocation), the UE 116 can determine that NW-initiated resource allocation cannot be employed, and as a result, UE-initiated resource allocation can be employed. The UE 116 can be configured to initiate resource allocation, and the UE 116 can initiate resource allocation, in part, by generating a request for resource allocation.

At 808, the request for resource allocation can be transmitted to the core network. In an aspect, the UE 116 can transmit the request for resource allocation to the core network 128 as part of the UE-initiated resource allocation. At 810, information related to resource allocation can be received. In one aspect, the UE 116 can receive information related to resource allocation (e.g., QoS) from the core network 128 to facilitate setting up a dedicated bearer between the UE 116 and the core network 128. At 812, a dedicated bearer can be set up between the UE and the core network. In an aspect, the received resource allocation information and/or other information can be utilized to facilitate establishing a dedicated bearer between the UE 116 and the core network 128 to facilitate desired communication by the UE 116 in the wireless communication environment.

Referring again to reference numeral 804, if it is determined that NW-initiated resource allocation is supported (and thus PCC is supported) by the current network, methodology 800 can proceed to reference numeral 814, and at 814, a determination can be made regarding whether NW-initiated resource allocation is a preferred mode of operation. If, at 814, it is determined that NW-initiated resource allocation is not a preferred mode of operation, methodology 800 can proceed to reference numeral 806, where UE-initiated resource allocation can be employed, and methodology 800 can proceed from that point. In an aspect, the UE 116 can receive an indicator, such as a NW-init preferred indicator, from the UE-side of the application which can be set to a desired value to indicate whether the NW-initiated resource allocation is the preferred mode of operation. The NW-initiated resource allocation can be a preferred mode of operation, for example, when Type 2 application is employed with the UE 116, except in certain instances, such as certain instances when the UE 116 is roaming and the visited network does not support PCC, where it can be desirable to utilize UE-initiated resource allocation. If Type 1 application is being employed, or it is otherwise desirable for UE-initiated resource allocation to be employed (e.g., when the UE 116 is roaming), the UE-side of the application can transmit an indicator having a disparate value to the UE 116 to inform the UE 116 that NW-initiated resource allocation is not preferred (or alternatively the UE-side of the application can provide no indicator regarding preferred mode of operation, where the UE 116 can determine NW-initiated resource allocation is not preferred when no such indicator is received).

If, at 814, it is determined that NW-initiated resource allocation is a preferred mode of operation, based at least in part on received indicator information (e.g., NW-init preferred indicator), at 816, a determination can be made as to whether the UE is roaming. If it is determined that the UE is roaming, methodology 800 can proceed to reference numeral 806 where UE-initiated resource allocation can be employed, and methodology 800 can proceed from that point. In an aspect, if the UE 116 determines that the UE 116 is roaming, the UE 116 can determine that UE-initiated resource allocation is to be employed to facilitate establishing a dedicated bearer between the UE 116 and the core network 128. In another aspect, if the core network 128 determines that the UE 116 is roaming, the core network 128 also can determine that UE-initiated resource allocation is to be employed.

If, at 816, it is determined that the UE is not roaming, at 818, it can be determined that NW-initiated resource allocation is to be utilized. In an aspect, the UE 116 can determine that NW-initiated resource allocation is to be utilized based at least in part on the received indicator information (e.g., indicating NW-initiated resource allocation is supported (and PCC is supported) and preferred). The UE 116 can be configured for NW-initiated resource allocation, and the UE 116 can wait to receive information related to resource allocation from the core network 128.

At 820, information related to resource allocation can be received from the core network based at least in part on a NW-initiated resource allocation. In an aspect, when the UE 116 is not roaming, and received indicator information indicates that the network supports PCC for NW-initiated resource allocation and NW-initiated resource allocation is a preferred mode of operation, the core network 128 can initiate resource allocation for the UE 116 and can transmit information related to resource allocation to the UE 116 to facilitate establishing a desired dedicated bearer between the UE 116 and the core network 128. At this point, methodology 800 can proceed to reference numeral 812, where a dedicated bearer can be set up for the UE. In an aspect, the received resource allocation information and/or other information can be utilized to facilitate establishing a dedicated bearer between the UE 116 and the core network 128 to facilitate desired communication by the UE 116 in the wireless communication environment.

Figure 9:
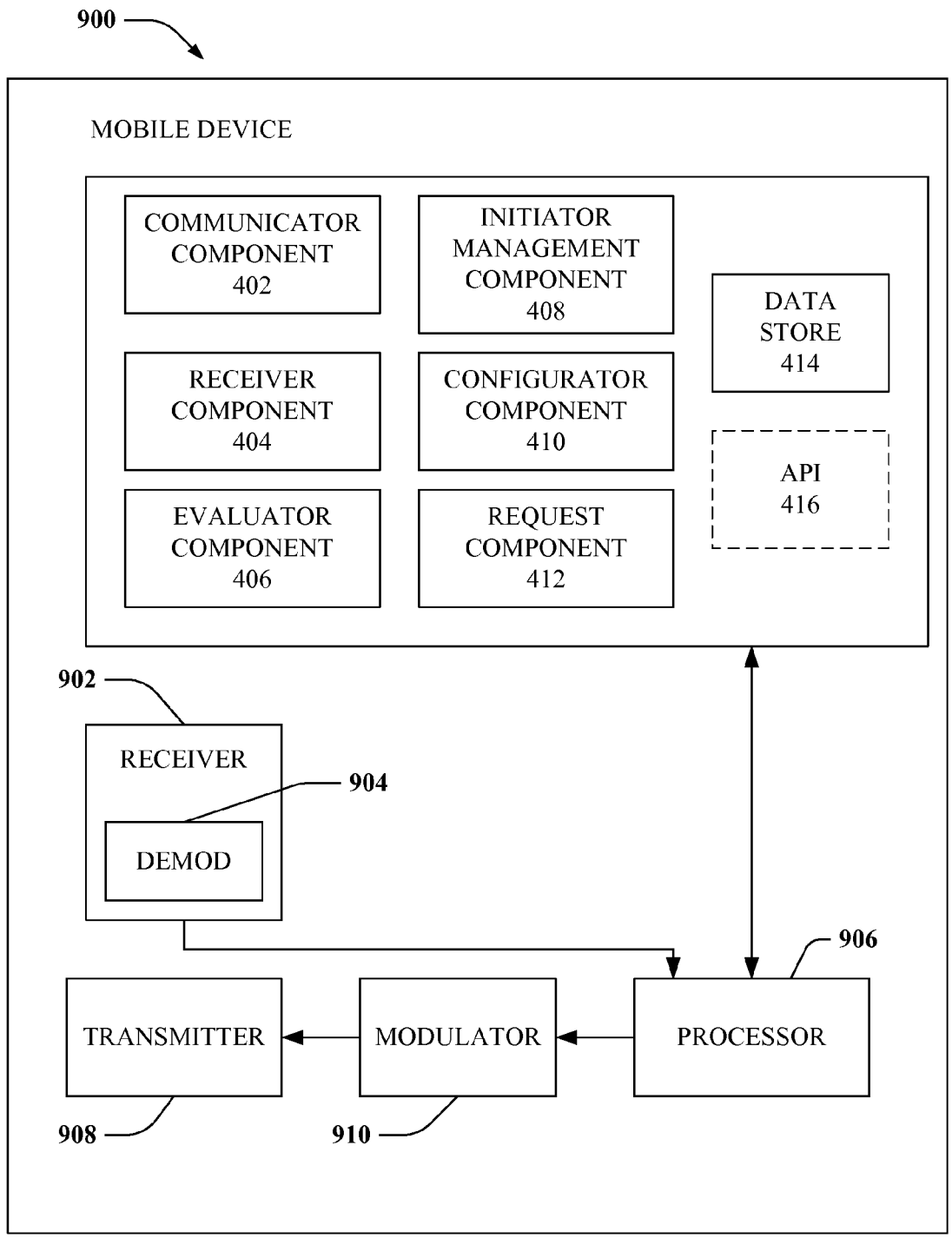
FIG. 9 is an illustration of a mobile device that can facilitate communications associated with a mobile device in a wireless communication system in accordance with an aspect of the disclosed subject matter.

FIG. 9 is an illustration of a mobile device 900 that can facilitate communications associated with a mobile device in a wireless communication system in accordance with an aspect of the disclosed subject matter. It is to be appreciated that the mobile device 900 can be the same or similar as, and/or can comprise the same or similar functionality as, mobile device 116, such as more described herein, for example, with regard to system 100, call flow 200, call flow 300, system 400, system 500, methodology 600, methodology 700, and methodology 800.

Mobile device 900 can comprise a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 908, a processor that controls one or more components of mobile device 900, and/or a processor that both analyzes information received by receiver 902, generates information for transmission by transmitter 908, and controls one or more components of mobile device 900. Mobile device 900 can also comprise a modulator 910 that can work in conjunction with the transmitter 908 to facilitate transmitting signals (e.g., data) to, for instance, a base station (e.g., 102), another mobile device (e.g., 122), etc.

In accordance with an aspect, the mobile device 900 can include a communicator component 402 which can be connected with the processor 906 and can be utilized to facilitate transmitting data to and/or receiving data from the base station 102 and/or another communication device (e.g., mobile phone, computer) (not shown) in the wireless communication environment. In another aspect, the mobile device 900 can comprise a receiver component 404 that can be connected with the processor 906 and can receive an indicator(s) and/or other information that can indicate whether the mobile device 900 is to initiate resource allocation (e.g., QoS) for the mobile device 900 or the core network 128 is to initiate resource allocation for the mobile device 900 and/or can indicate whether the network (e.g., 128) can support NW-initiated resource allocation.

The mobile device 900 also can contain an evaluator component 406 that can be connected with the processor 906 and can evaluate information, such as a NW-init support indicator and/or a NW-init preferred indicator, to facilitate determining whether the mobile device 900 is to initiate resource allocation for the mobile device 900 or the core network 128 is to initiate resource allocation for the mobile device 900. In another aspect, the mobile device 900 can include an initiator management component 408 that can be connected with the processor 906 and can determine whether the mobile device 900 is to initiate resource allocation for the mobile device 900 or the core network 128 is to initiate resource allocation for the mobile device 900 based at least in part on the evaluation of information, including received information, such as a PCC support indicator, a NW-init support indicator and/or a NW-init preferred indicator. For instance, the initiator management component 408 can control the mobile device 900 to have the mobile device 900 initiate resource allocation or not initiate resource allocation for the mobile device 900 based at least in part on the received indicator(s) or other information.

In still another aspect, the mobile device 900 also can contain a configurator component 410 that can be connected with the processor 906 and can facilitate configuring the mobile device 900, such as components therein, for example, to initiate resource allocation for the mobile device 900 when the UE-initiated resource allocation is desired, and/or to establish QoS for the mobile device 900 in accordance with QoS rules. The mobile device 900 can further include a request component 412 that can be connected with the processor 906 and can generate a request for resource allocation when UE-initiated resource allocation is desired, where the request for resource allocation can be communicated to the core network 128 via the base station 102 by the communicator component 402.

Mobile device 900 can additionally comprise data store 414 that can be connected with the processor 906 and can be operatively coupled to processor 906 and can store data to be transmitted, received data, information related to base stations and/or cells, information related to the mobile device 900, and/or any other suitable information that can facilitate UE-initiated resource allocation or NW-initiated resource allocation, as desired, and communication of data associated with the mobile device 900. Data store 414 can additionally store protocols and/or algorithms respectively associated with UE-initiated resource allocation and NW-initiated resource allocation for the mobile device 900, establishing QoS for the mobile device 900, setting up a bearer between the mobile device 900 and a core network (e.g., 128), and/or other functions related to the mobile device 900.

In accordance with an embodiment, the mobile device 900 optionally can include an API 416 that can be utilized to facilitate access to certain information, such as the NW-init preferred indicator. Desired information can be made available via the API 416 to desired entities, such as application developers, who can utilize such information for desired purposes, such as developing applications, for example.

It is to be appreciated and understood that the communicator component 402, receiver component 404, evaluator component 406, initiator management component 408, configurator component 410, request component 412, data store 414, and optional API 416 each can be the same or similar as, or can comprise the same or similar functionality as, respective components such as more fully described herein, for example, with regard to system 400. It is to be further appreciated and understood that the communicator component 402, receiver component 404, evaluator component 406, initiator management component 408, configurator component 410, request component 412, data store 414, and optional API 416 each can be a stand-alone unit (as depicted), can be included within the processor 906, can be incorporated within another component, and/or virtually any suitable combination thereof, as desired.

Figure 10:
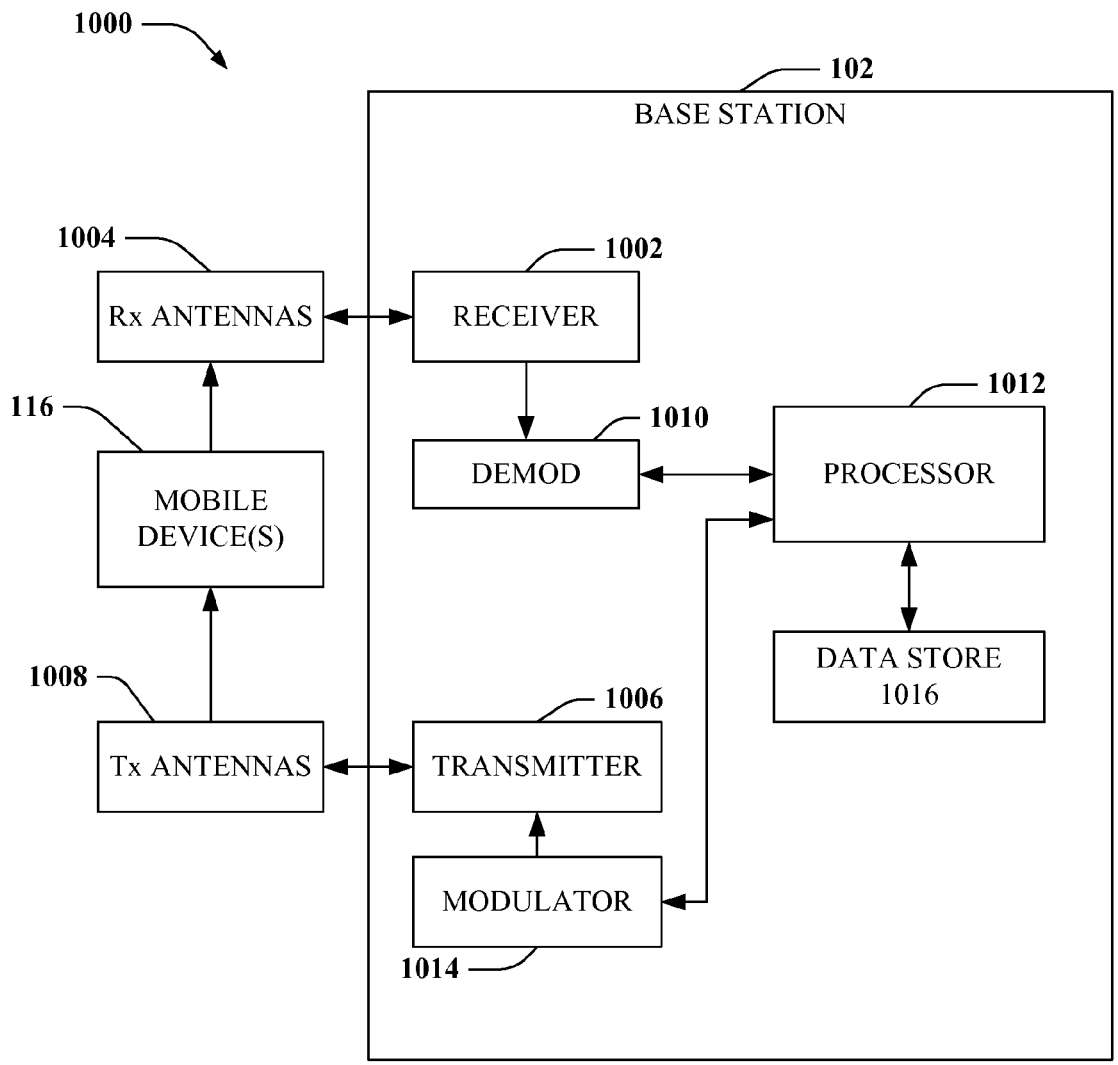
FIG. 10 is an illustration of a system that can facilitate communications associated with a mobile device in a wireless communication system in accordance with an aspect of the disclosed subject matter.

FIG. 10 is an illustration of a system 1000 that can facilitate communications associated with a mobile device in a wireless communication system in accordance with an aspect of the disclosed subject matter. System 1000 can comprise a base station 102 (e.g., access point, . . . ). The base station 102 can include a receiver 1002 that can receive signal(s) from one or more mobile devices 116 through a plurality of receive antennas 1004, and a transmitter 1006 that can transmit signals (e.g., data) to the one or more mobile devices 116 through a transmit antenna 1008. Receiver 1002 can receive information from receive antennas 1004 and can be operatively associated with a demodulator 1010 that can demodulate received information. Demodulated symbols can be analyzed by a processor 1012 that can be a processor dedicated to analyzing information received by receiver 1002 and/or generating information for transmission by a transmitter 1006, a processor that controls one or more components of base station 102, and/or a processor that both analyzes information received by receiver 1002, generates information for transmission by transmitter 1006, and controls one or more components of base station 102. The base station 102 can also comprise a modulator 1014 that can work in conjunction with the transmitter 1006 to facilitate transmitting signals (e.g., data) to, for instance, a mobile device 116, another device, etc.

Processor 1012 can be coupled to a data store 1016 that can store data to be transmitted, received data, information related to base stations (e.g., base station 102), information related to a mobile device(s) (e.g., 116), information related to cells, and any other suitable information that can facilitate communication of information (e.g., voice, data) associated with a mobile device(s) (e.g., 116). Data store 1016 can additionally store protocols and/or algorithms associated with and facilitating communicating with a mobile device(s) (e.g., 116), another base station, cells, or another device. It is to be appreciated and understood that the data store 1016 can be a stand-alone unit (as depicted), can be included within the processor 1012, can be incorporated within another component, and/or virtually any suitable combination thereof, as desired.

In an aspect, the data store 1016 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 1016 is intended to comprise, without being limited to, these and any other suitable types of memory.

Figure 11:
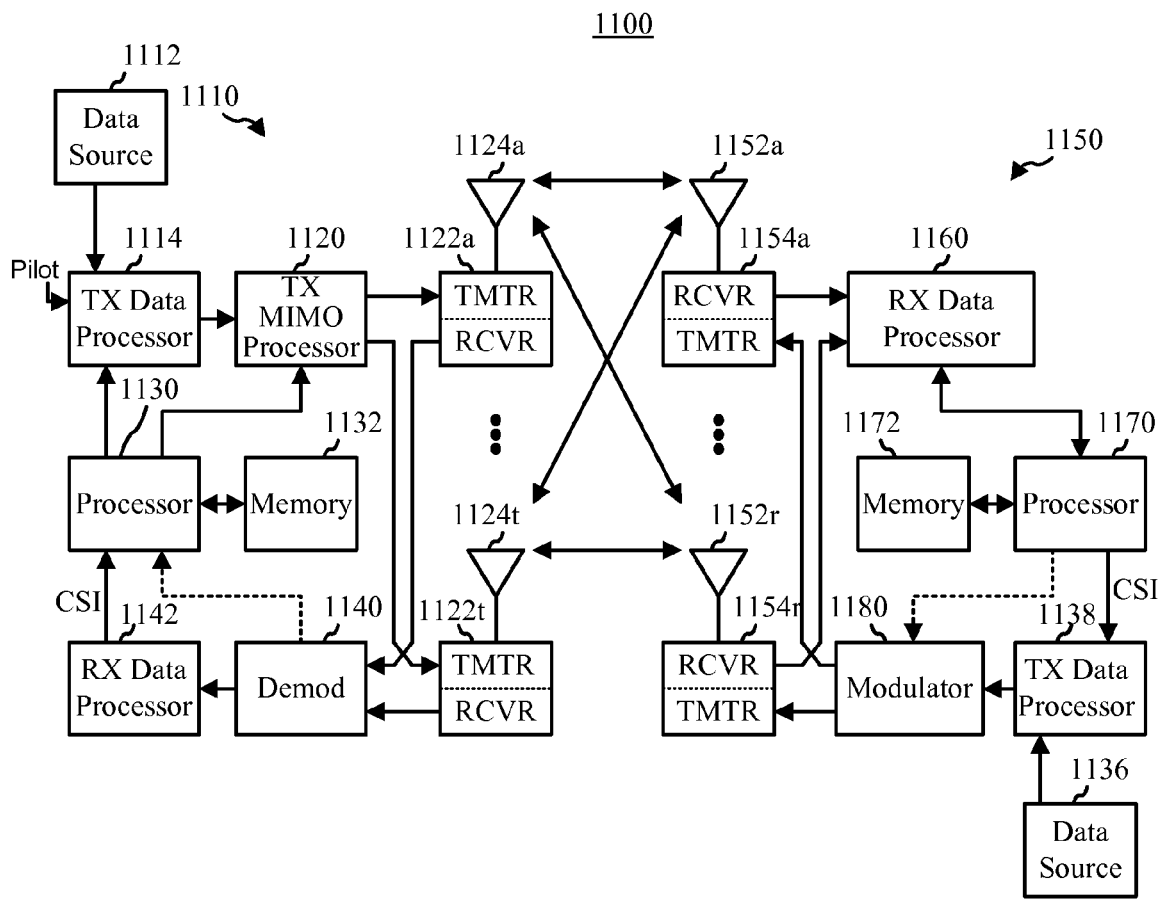
FIG. 11 illustrates an example wireless communication system in accordance with an aspect of the disclosed subject matter.

FIG. 11 illustrates an example wireless communication system 1100 in accordance with an aspect of the disclosed subject matter. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1, 4, 5, 9, 10) and/or methods (FIGS. 6-8) described herein to facilitate wireless communication there between. It is to be appreciated that base station 1110 and mobile device 1150 each can be respectively the same or similar as, and/or can comprise respectively the same or similar functionality as, respective components as more fully described herein, such as, for example, with regard to system 100, call flow 200, call flow 300, system 400, system 500, methodology 600, methodology 700, methodology 800, system 900, and/or system 1000.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and down-converts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which precoding matrix to use (discussed below). Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message and can determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels can comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
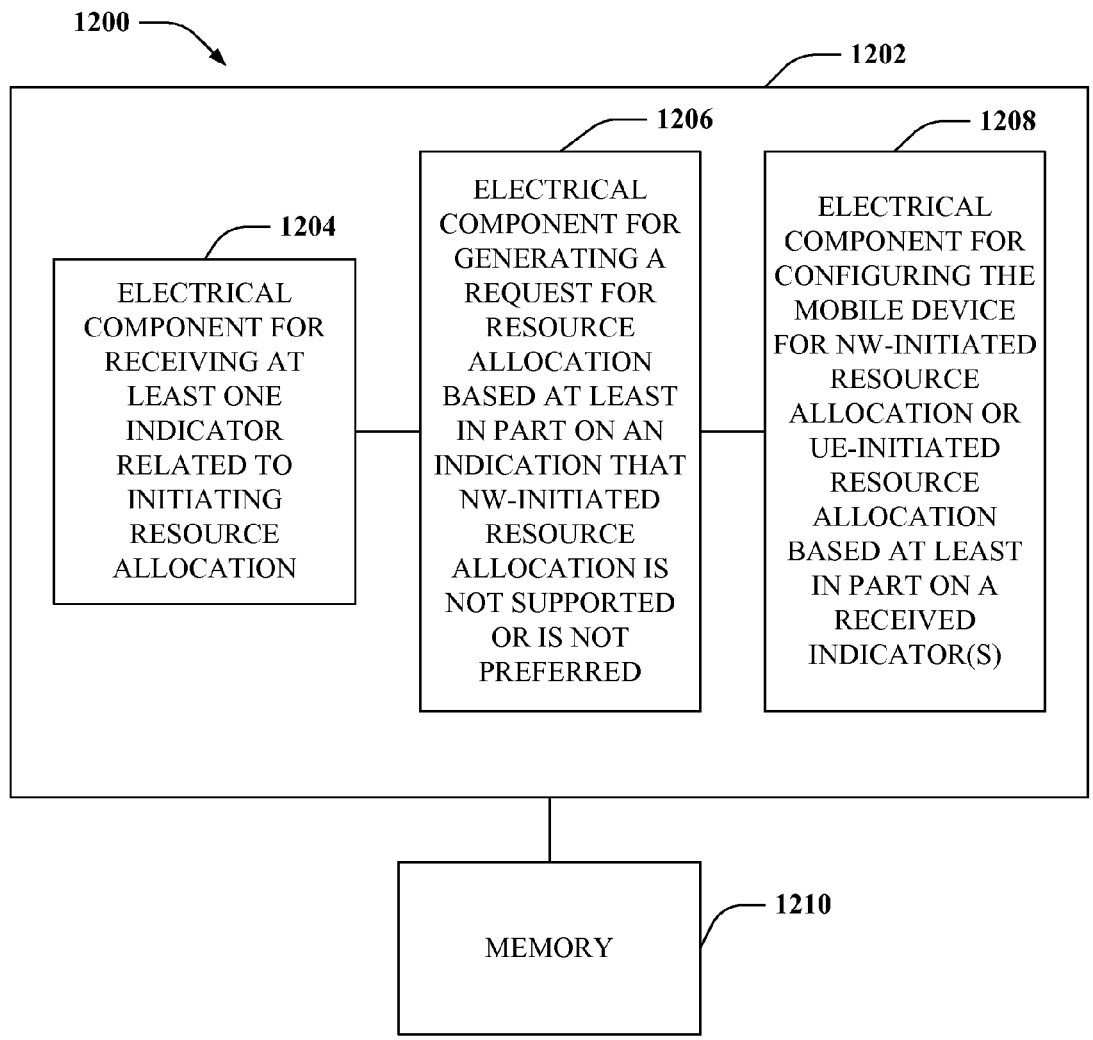
FIG. 12 depicts a system that can facilitate communication associated with a mobile device in a wireless communication environment.

With reference to FIG. 12, depicted is a system 1200 that can facilitate communication associated with a mobile device in a wireless communication environment. For example, system 1200 can reside at least partially within a mobile device (e.g., 116). It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction.

For instance, logical grouping 1202 can include an electrical component for receiving at least one indicator related to initiating resource allocation 1204. In an aspect, the electrical component 1204 can facilitate receiving an indicator(s), such as a PCC support indicator, a NW-init support indicator and/or a NW-init preferred indicator, that can be evaluated to facilitate determining whether the mobile device or the core network is to initiate resource allocation for the mobile device.

Further, logical grouping 1202 can comprise an electrical component for generating a request for resource allocation based at least in part on an indication that NW-initiated resource allocation is not supported or is not preferred 1206. In one aspect, the electrical component 1206 can generate a request for resource allocation, for example, if an indicator(s) is received that indicates that the current network does not support PCC, does not support NW-initiated resource allocation and/or NW-initiated resource allocation is not the preferred mode of operation by the application utilized by the mobile device.

Logical grouping 1202 also can include an electrical component for configuring the mobile device for NW-initiated resource allocation or UE-initiated resource allocation based at least in part on a received indicator(s) 1208. In one aspect, the electrical component 1208 can configure the mobile device to initiate resource allocation by generating a request for resource allocation if it is determined that PCC for NW-initiated resource allocation is not supported by the current network and/or NW-initiated resource allocation is not preferred by the application (e.g., Type 2 application) employed for the mobile device. Additionally, system 1200 can include a memory 1210 that can retain instructions for executing functions associated with electrical components 1204, 1206, and 1208. While shown as being external to memory 1210, it is to be understood that one or more of electrical components 1204, 1206, and 1208 can exist within memory 1210.

Figure 13:
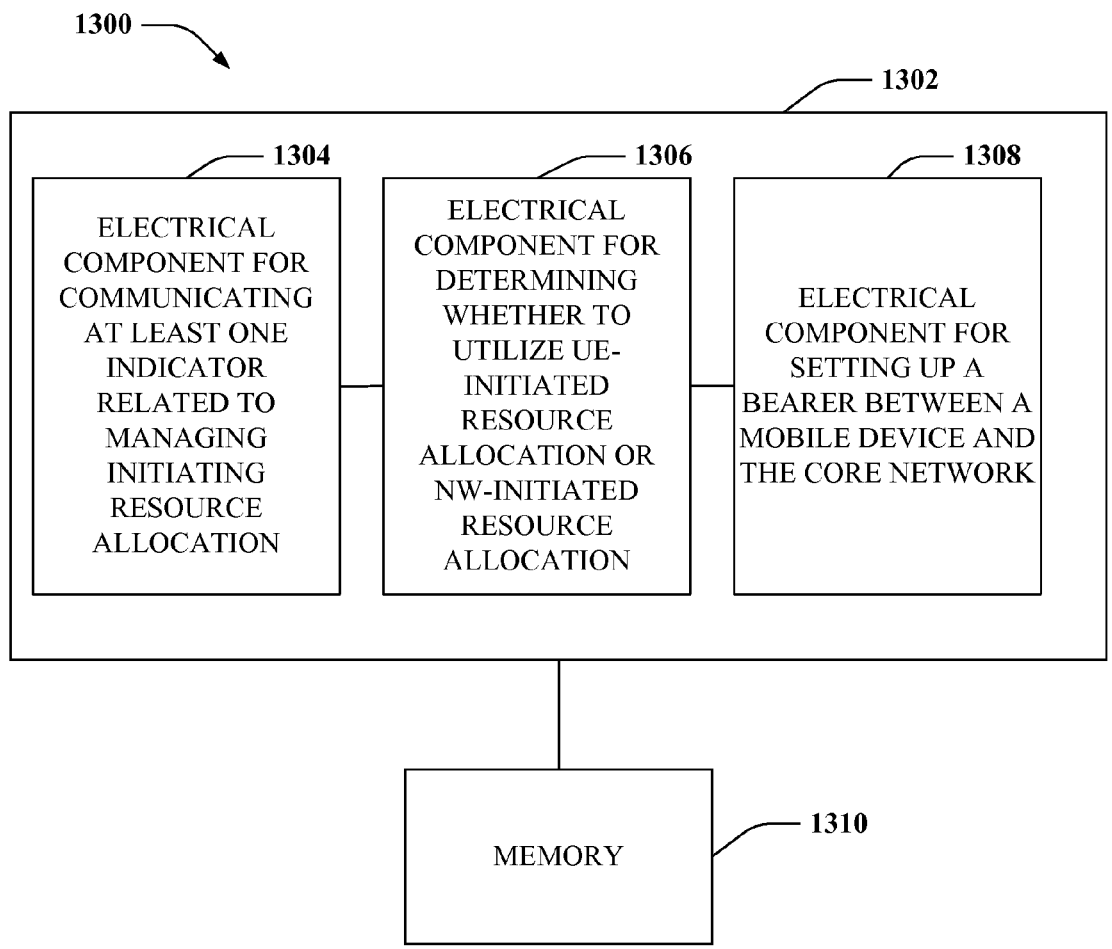
FIG. 13 illustrates a system that can facilitate communication associated with a mobile device in a wireless communication environment.

Turning to FIG. 13, illustrated is a system 1300 that can facilitate communication associated with a mobile device in a wireless communication environment. For example, system 1300 can reside at least partially within a core network 128 that can be associated (e.g., wirelessly connected) with a mobile device (e.g., 116) via a base station 102. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction.

In one aspect, logical grouping 1302 can include an electrical component for communicating at least one indicator related to managing initiating resource allocation 1304. In one aspect, the electrical component 1304 can transmit one or more indicators, such as a PCC support indicator or a NW-init support indicator, to a mobile device, where the indicator(s) can facilitate determining whether NW-initialized resource allocation or UE-initiated resource allocation is to be utilized to facilitate establishing resource allocation between a mobile device and the core network.

Further, logical grouping 1302 can comprise an electrical component for determining whether to utilize UE-initiated resource allocation or NW-initiated resource allocation 1306. In one aspect, the electrical component 1306 can determine whether a Type 1 application or Type 2 application is being employed with regard to a mobile device. For instance, if PCC and NW-initiated resource allocation is supported by the current network (e.g., 128), and it is determined that a Type 2 application is employed with regard to a mobile device, the electrical component 1306 can determine that NW-initiated resource allocation is to be employed to facilitate establishing QoS between the core network and mobile device. If PCC and NW-initiated resource allocation is not supported by the current network and/or it is determined that a Type 2 application is not employed (e.g., a Type 1 application is employed) with regard to a mobile device, the electrical component 1306 can determine that UE-initiated resource allocation is to be employed to facilitate establishing QoS between the core network and mobile device.

Logical grouping 1302 also can include an electrical component for setting up a bearer between a mobile device and the core network 1308. In one aspect, the electrical component 1308 can facilitate transmitting information to or receiving information from a mobile device to facilitate establishing a bearer between the mobile device and core network. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method that facilitates communication by a mobile communication device in a wireless network environment, comprising:
    receiving at least one indicator that indicates at least whether Policy and Charging Control (PCC) for network-initiated resource allocation is supported by a core network to facilitate determining whether resource allocation for the mobile communication device is to be initiated by the mobile communication device or the core network;
    receiving at least one other indicator or configuration that indicates whether an application employed with the mobile communication device prefers initiation of the resource allocation by the core network; and
    establishing a bearer between the mobile communication device and the core network in accordance with the resource allocation initiated by the mobile communication device or the core network based at least in part on the indicators.

2. The method of claim 1, further comprising:
    determining that the core network is to initiate the resource allocation for the mobile communication device based at least in part on the indicators.

3. The method of claim 1, the at least one indicator is received by the mobile communication device when an application that prefers network-initiated resource allocation but also supports mobile-communication-device-initiated resource allocation is being employed with the communication device, wherein such application is an operator controlled application.

4. The method of claim 1, further comprising:
    determining that the mobile communication device is to initiate the resource allocation for the mobile communication device when at least one of the at least one indicator is not received by the mobile communication device or the at least one indicator indicates that the mobile communication device is to initiate the resource allocation for the mobile communication device;
    generating a request for resource allocation; and
    transmitting the request for resource allocation to the core network to facilitate establishing the bearer between the mobile communication device and the core network.

5. The method of claim 4, further comprising:
    employing an application that supports only mobile-communication-device-initiated resource allocation with the mobile communication device in accordance with mobile-communication-device-initiated resource allocation based at least in part on the at least one indicator, wherein such application is operator controlled or is not operator controlled.

6. The method of claim 1, further comprising:
    determining that the mobile communication device is roaming;
    determining that the mobile communication device is to initiate the resource allocation for the mobile communication device based at least in part on determining that the mobile communication device is roaming and the at least one indicator indicates Policy and Charging Control (PCC) is not supported by the roaming network;
    generating a request for resource allocation; and
    transmitting the request for resource allocation to the core network to facilitate establishing the bearer between the mobile communication device and the core network.

7. The method of claim 6, further comprising:
employing at least one of an application supporting mobile-communication-device-initiated resource allocation or an application preferring network-initiated resource allocation but also supporting mobile-communication-device-initiated resource allocation with the mobile communication device.

8. The method of claim 1, wherein the resource allocation relates to Quality of Service (QoS) associated with the mobile communication device.

9. A wireless communications apparatus, comprising:
a memory that retains instructions related to reception of at least one indicator that indicates whether Policy and Charging Control (PCC) for network-initiated resource allocation is supported by a core network and resource allocation for a mobile communication device is to be initiated by the mobile communication device or the core network, reception of at least one other indicator that indicates whether network-initiated resource allocation is preferred by an application associated with the mobile communication device, and set up of a bearer between the mobile communication device and the core network in accordance with the resource allocation initiated by the mobile communication device or the core network based at least in part on the indicators; and
a processor, coupled to the memory, configured to execute the instructions retained in the memory.

10. The wireless communications apparatus of claim 9, wherein the application is an application that prefers network-initiated resource allocation but supports mobile-communication-device-initiated resource allocation and the application that is an operator controlled application.

11. The wireless communications apparatus of claim 9, wherein the memory retains instructions related to:
connection to an access network;
determination that the mobile communication device is to initiate the resource allocation for the mobile communication device when at least one of the indicators is not received by the mobile communication device or indicates that the mobile communication device is to initiate the resource allocation for the mobile communication device;
generation of a request for resource allocation; and
transmission of the request for resource allocation to the core network to facilitate establishing the bearer between the mobile communication device and the core network.

12. A wireless communications apparatus that facilitates communication associated with a mobile device, comprising:
means for receiving at least one indicator that indicates whether Policy and Charging Control (PCC) for network-initiated resource allocation is supported by a core network and resource allocation for the mobile device is to be initiated by the mobile device or the core network;
means for receiving at least one other indicator or configuration that indicates whether an application employed with the mobile device prefers initiation of the resource allocation by the core network; and
means for establishing a bearer between the mobile device and the core network in accordance with the resource allocation initiated by the mobile device or the core network based at least in part on the indicators.

13. The wireless communications apparatus of claim 12, further comprising:
means for determining that the mobile device is to initiate the resource allocation for the mobile device when at least one of the at least one indicator is not received by the mobile device or the at least one indicator indicates that the mobile device is to initiate the resource allocation for the mobile device;
means for generating a request for resource allocation; and
means for transmitting the request for resource allocation to the core network to facilitate establishing the bearer between the mobile device and the core network.

14. A non-transitory computer-readable medium comprising:
a first set of codes for causing a computer to receive at least one indicator that indicates whether Policy and Charging Control (PCC) for network-initiated resource allocation is supported by a core network and resource allocation for the mobile communication device is to be initiated by the mobile communication device or the core network;
a second set of codes for causing a computer to receive at least one other indicator or configuration that indicates whether an application employed with the mobile communication device prefers initiation of the resource allocation by the core network; and
a third set of codes for causing the computer to set up a bearer between the mobile communication device and the core network in accordance with the resource allocation initiated by the mobile communication device or the core network based at least in part on the indicators.

15. The non-transitory computer-readable medium of claim 14, further comprising:
a fourth set of codes for causing a computer to determine that the mobile communication device is to initiate the resource allocation for the mobile communication device when at least one of the at least one indicator is not received by the mobile communication device or the at least one indicator indicates that the mobile communication device is to initiate the resource allocation for the mobile communication device;
a fifth set of codes for causing a computer to generate a request for resource allocation; and
a sixth set of codes for causing a computer to transmit the request for resource allocation to the core network to facilitate establishing the bearer between the mobile communication device and the core network.

16. In a wireless communications system, an apparatus comprising:
a processor configured to:
receive at least one indicator that indicates whether Policy and Charging Control (PCC) for network-initiated resource allocation is supported by a core network and resource allocation for a mobile device is to be initiated by the mobile device or the core network, and to receive at least one other indicator or configuration that indicates whether an application employed with the mobile communication device prefers initiation of the resource allocation by the core network; and
establish a bearer between the mobile device and the core network in accordance with the resource allocation initiated by the mobile device or the core network based at least in part on the at least one indicator.

17. A method that facilitates communication associated with a mobile device, comprising:
transmitting at least one indicator to the mobile device to facilitate indicating to the mobile device that Policy and Charging Control (PCC) for network-initiated resource allocation is supported and at least one of a core network is to initiate resource allocation associated with the mobile device or the mobile device is to initiate the resource allocation associated with the mobile device;

transmitting at least one other indicator or configuration to the mobile device, the at least one other indicator indicating whether network-initiated resource allocation is preferred by an application employed with the mobile device; and establishing a bearer between the mobile device and the core network in accordance with the resource allocation initiated by the mobile device or the core network based at least in part on the indicators.

18. The method of claim 17, further comprising:

configuring a Policy and Charging Rules Function (PCRF) for a Type 2 application, where the Type 2 application is an operator controlled application to facilitate employing network-initiated resource allocation as a preferred mode of operation but also supports mobile-device-initiated resource allocation.

19. The method of claim 18, further comprising:

setting up a gateway control session between the Policy and Charging Rules Function (PCRF) and a signaling gateway (SGW), associated with the core network, wherein support for network-initiated resource allocation is indicated;

setting up an internet protocol connectivity access network between the Policy and Charging Rules Function (PCRF) and a Public Data Network Gateway (PGW), associated with the core network, wherein support for network-initiated resource allocation is indicated.

20. The method of claim 19, further comprising:

receiving service information comprising information indicating that the Type 2 application is being employed with the mobile device;

provisioning Policy and Charging Control (PCC) rules; and provisioning Quality of Service (QoS) rules to facilitate establishing the bearer.

21. The method of claim 17, further comprising:

receiving service information indicating that an application supporting mobile-device-initiated resource allocation only is employed with the mobile device;

at least one of:

transmitting the at least one indicator to the mobile device, wherein the at least one indicator indicates that the Policy and Charging Control (PCC) for network-initiated resource allocation is not supported and resource allocation is to be initiated by the mobile device, or omitting transmission of the at least one indicator to the mobile device, wherein the at least one indicator indicates that initiation of the resource allocation by the core network is supported and preferred;

determining that the mobile device is to initiate the resource allocation; and receiving a request for the resource allocation from the mobile device to facilitate establishing the bearer.

22. The method of claim 17, further comprising:

receiving information indicating that the mobile device is roaming, wherein an application that supports mobile-device-initiated resource allocation only or an application that prefers network-initiated resource allocation but supports mobile-device-initiated resource allocation is employed with the mobile device;

determining that the mobile device is to initiate the resource allocation; and receiving a request for the resource allocation from the mobile device to facilitate establishing the bearer.

23. A wireless communications apparatus, comprising:

a memory that retains instructions related to transmission of at least one indicator to a mobile device to facilitate indicating to the mobile device that Policy and Charging Control (PCC) for network-initiated resource allocation is supported and at least one of a core network is to initiate resource allocation associated with the mobile device or the mobile device is to initiate the resource allocation associated with the mobile device, transmission of at least one other indicator or configuration that indicates whether network-initiated resource allocation is preferred by an application associated with the mobile device, and establishment of a bearer between the mobile device and the core network in accordance with the resource allocation initiated by the mobile device or the core network based at least in part on the indicators; and a processor, coupled to the memory, configured to execute the instructions retained in the memory.

24. A wireless communications apparatus that facilitates communication associated with a mobile communication device, comprising:

means for transmitting at least one indicator to the mobile communication device to facilitate indicating to the mobile communication device that Policy and Charging Control (PCC) for network-initiated resource allocation is supported and at least one of a core network is to initiate resource allocation associated with the mobile communication device or the mobile communication device is to initiate the resource allocation associated with the mobile communication device;

means for transmitting at least one other indicator or configuration to the mobile communication device, the at least one other indicator indicating whether network-initiated resource allocation is preferred by an application employed with the mobile communication device; and means for setting up a bearer between the mobile communication device and the core network in accordance with the resource allocation initiated by the mobile communication device or the core network based at least in part on the indicators.

25. A non-transitory computer-readable medium comprising:

a first set of codes for causing a computer to transmit at least one indicator to a mobile communication device to facilitate indicating to the mobile communication device that Policy and Charging Control (PCC) for network-initiated resource allocation is supported and at least one of a core network is to initiate resource allocation associated with the mobile communication device or the mobile communication device is to initiate the resource allocation associated with the mobile communication device;

a second set of codes for causing a computer to transmit at least one other indicator or configuration to the mobile communication device, the at least one other indicator indicating whether network-initiated resource allocation is preferred by an application employed with the mobile communication device; and a third set of codes for causing a computer to establish a bearer between the mobile communication device and the core network in accordance with the resource allocation initiated by the mobile communication device or the core network based at least in part on the indicators.

26. The non-transitory computer-readable medium of claim 25, further comprising:
a fourth set of codes for causing a computer to configure a Policy and Charging Rules Function (PCRF) for a Type 2 application, where the Type 2 application is an operator controlled application to facilitate employing network-initiated resource allocation as a preferred mode of operation but also supports mobile-communication-device-initiated resource allocation.

27. The non-transitory computer-readable medium computer program product of claim 26, further comprising:
a computer readable medium comprising code for:
an fifth set of codes for causing a computer to receive service information comprising information indicating that the Type 2 application is being utilized with the mobile communication device;
a sixth set of codes for causing a computer to provision Policy and Charging Control (PCC) rules; and
a seventh set of codes for causing a computer to provision Quality of Service (QoS) rules to facilitate establishing the bearer.

28. The non-transitory computer-readable medium of claim 25, further comprising:
a fourth set of codes for causing a computer to receive service information indicating that a Type 1 application that supports only mobile-communication-device-initiated resource allocation is utilized with the mobile communication device;
a fifth set of codes for causing a computer to at least one of:
transmit the at least one indicator to the mobile communication device, wherein the at least one indicator indicates that the resource allocation is to be initiated by the mobile communication device, or
omit transmission of the at least one indicator to the mobile communication device, wherein the at least one indicator indicates that initiation of the resource allocation by the core network is supported and preferred;
a sixth set of codes for causing a computer to determine that the mobile communication device is to initiate the resource allocation; and
a seventh set of codes for causing a computer to receive a request for the resource allocation from the mobile device to facilitate establishing the bearer.

29. In a wireless communications system, an apparatus comprising:
a processor configured to:
transmit at least one indicator to the mobile communication device to facilitate indicating to the mobile communication device that Policy and Charging Control (PCC) for network-initiated resource allocation is supported and at least one of a core network is to initiate resource allocation associated with the mobile communication device or the mobile communication device is to initiate the resource allocation associated with the mobile communication device;
transmit at least one other indicator or configuration to the mobile device indicating whether network-initiated resource allocation is preferred by an application employed with the mobile device; and
set up a bearer between the mobile communication device and the core network in accordance with the resource allocation initiated by the mobile communication device or the core network based at least in part on the indicators.

* * * * *